(12) United States Patent
Jyothi et al.

(10) Patent No.: US 11,696,317 B2
(45) Date of Patent: Jul. 4, 2023

(54) SIGNALING METHODS TO ALTER THE NUMBER OF CONTROL CHANNEL BLIND DECODINGS IN INTEGRATED ACCESS AND BACKHAUL

(71) Applicants: Centre of Excellence in Wireless Technology, Chennai (IN); Indian Institute of Technology Madras (IIT Madras), Chennai (IN)

(72) Inventors: Pardhasarathy Jyothi, Chennai (IN); Deepak Padmanabhan Maya, Chennai (IN); Chandrasekaran Mohandoss, Chennai (IN); Thirunageswaram Ramachandran Ramya, Chennai (IN); Klutto Milleth Jeniston Deviraj, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS, Chennai (IN)

( * ) Notice: Subject to any disclaimer, the term of this patent is extended or adjusted under 35 U.S.C. 154(b) by 0 days.

(21) Appl. No.: 17/857,957

(22) Filed: Jul. 5, 2022

(65) Prior Publication Data
US 2022/0338200 A1    Oct. 20, 2022

Related U.S. Application Data

(62) Division of application No. 17/091,261, filed on Nov. 6, 2020.

(30) Foreign Application Priority Data

Nov. 8, 2019    (IN) .............................. 201941045593

(51) Int. Cl.
H04W 72/04    (2023.01)
H04W 72/53    (2023.01)
H04W 88/14    (2009.01)
H04W 72/0446    (2023.01)
H04W 72/23    (2023.01)

(52) U.S. Cl.
CPC ....... H04W 72/53 (2023.01); H04W 72/0446 (2013.01); H04W 72/23 (2023.01); H04W 88/14 (2013.01)

(58) Field of Classification Search
CPC ........... H04W 72/0493; H04W 72/042; H04W 72/0446; H04W 88/14; H04W 88/085; H04W 28/16
See application file for complete search history.

(56) References Cited

U.S. PATENT DOCUMENTS

2019/0089486 A1*  3/2019  Kim ....................... H04L 1/0072
2019/0306737 A1*  10/2019  Kwak .................. H04W 24/08

* cited by examiner

*Primary Examiner* — Jamal Javaid

(57) ABSTRACT

Accordingly embodiments herein achieve signaling method and system (2000) for provisioning signalling in an Integrated Access Backhaul (IAB) network (1000). The method includes providing a set of modifications in uplink and downlink signaling for an IAB node (100). The modifications either help to reduce the control channel payload or enable more flexible signaling of resources, improve efficient control channel scheduling and also avoid conflicts that might arise due to discrepancies between semi static and dynamic resource allocation.

7 Claims, 20 Drawing Sheets

(Conti.)

(Conti.)

SIGNALING METHODS TO ALTER THE NUMBER OF CONTROL CHANNEL BLIND DECODINGS IN INTEGRATED ACCESS AND BACKHAUL

The present application is a divisional application of U.S. Ser. No. 17/091,261 filed on 6 Nov. 2020 which is based on, and claims priority from an Indian Provisional Application Number 201941045593 dated 8 Nov. 2019 the disclosure of which is hereby incorporated by reference herein.

FIELD OF INVENTION

The present disclosure relates to a wireless communication, and more specifically related to a method and system for provisioning signalling in an Integrated Access Backhaul (IAB) network.

BACKGROUND OF INVENTION

The fascination of the modern society towards high data rate applications in a high mobility scenario is continuously pushing the borders of wireless communication systems. The fifth-generation (5G) and beyond communication is expected to address these data rate demands by improving the spectral efficiency of the existing spectrum, and by exploring new spectrum in millimeter wave (mmWave) frequency bands. Multiple antenna techniques and frequency reuse along with other transmitter and receiver mechanisms are the major developments in improving the efficiency of spectrum, whereas mmWave communication is a significant development in exploring a new spectrum. In mmWave communication higher frequencies above 6 GHz are used. Since a large amount of bandwidth is available in the mmWave range, can be utilized in supporting a very high data rate to users.

Further, mmWave is characterized by high directivity and it accounts for improving the spatial reuse with significantly reduced co-channel interference (CCI). Moreover, mmWave is subject to high attenuation, and this along with its directivity results in smaller and sparse cell coverage, at least in urban and semi-urban scenarios. This necessitates network densification to cover the entire coverage area using many transmission points. However, backhauling these densified networks is a major challenge. Deployment and maintenance of optical fiber to many small cells may not be an economically viable option, and self-backhauling is a possible alternative. Self-backhauling is defined as when the access and the backhaul share the same wireless channel. Here, access denotes the link from a base station (BS) also known as (a.k.a) gNB in 5G and eNB in 4G or a relay to a user equipment (UE) (200), whereas, backhaul accounts for the link between BS to another BS or BS to a core network or BS to relay. The sharing of wireless channel resource for access and backhaul can be done using one of time, frequency, code, and space, and this type of network is called integrated access and backhaul (IAB) network (1000).

The IAB network (1000) can be used for extending the coverage of an existing cell, known as coverage extension, or for improving the capacity by reusing the same frequency by overlaying small cells over the regular macro cell coverage area. This is a.k.a heterogeneous network. The coverage extension IAB node (100) is placed in a region where the coverage of original gNB is weaker for UE (200) to detect the data or there is no coverage due to blockages, e.g., inside a building. The IAB node (100), generally expected to be a line of sight (LoS) with the gNB can communicate efficiently in those scenarios. Now, the UE (200) can get associated with the IAB node (100) and get services, thereby extending the coverage area. On the other hand, in a capacity enhancement scenario, when a gNB is heavily loaded, an IAB node (100) can act as an alternate gNB and provide service to a set of UEs (200) associated with it, thereby improving the capacity and/or can act as an alternate gNB for balancing the load. FIG. 1 illustrates the basic IAB deployment and its use cases.

FIG. 2 illustrates the basic block diagram of a multi-hop IAB network (1000). The node which has a wired connection to the core network is called a donor node (100d), and the other nodes are called IAB nodes (100). The IAB nodes (100) are connected to the donor node (100d) wirelessly. Similarly, an IAB node (100) can be further connected to other child IAB nodes (100c), leading to a multi-hop scenario. The donor node (100d) and IAB nodes (100) can have UEs attached to them. Hence, an IAB node (100) has dual functionality: the unit that acts like BS to the UEs (200) and IAB nodes (100) connected to it, called a distributed unit (DU), and the unit that acts as a mobile terminal (MT) for a parent IAB node (100b) to which it is connected. In FIG. 2, if IAB node 2 is considered as reference node (100a), then IAB node 1 is the parent IAB node (100b) and IAB node 3 is the child IAB node (100c). Again, an access UE (200) is connected to IAB node 2. Therefore, there are three links associated with an IAB node (100): backhaul link for communicating with the parent IAB node (100b), child link for communicating to the child IAB nodes (100c), and access link for serving the UEs.

The available time-frequency resources in the IAB network (1000) need to be efficiently shared among access and backhaul links one of semi-statically and dynamically. Proper resource allocation strategies between the MT and DU portion of the IAB node (100) is necessary to avoid interference between transmissions. The resources can be multiplexed between parent and child links in one of time, frequency, space, and code and are called time-division multiplexing (TDM), frequency division multiplexing (FDM), space division multiplexing (SDM), and code division multiplexing (CDM), respectively, or a combination of the above. For illustration, TDM case is considered in which either parent or child link is active at a time. The MT of an IAB node (100) can be configured with downlink (DL), uplink (UL), and flexible (F) resources. The flexible resources are configured with a combination of DL and UL resources, based on the available traffic in DL and UL directions. It is also used to handle the necessary guard period in half-duplex schemes. However, the DU of an IAB node (100) has UL, DL, F, and not available (NA) types of resources. The NA time resource implies that it should not be used for communication on the DU child links. Further, each of the UL, DL, and F time resources of the DU can be configured as hard (H) and soft (S) resources. The resource configured as hard is always made available for the child IAB node (100c)'s DU link, while the availability of resource configured as soft for the child IAB node (100c)'s DU link is controlled by the parent link. If the parent IAB node (100b) is not using the resource, it is indicated implicitly or explicitly to its child IAB node (100c), enabling the child IAB node (100c) to use the resource. Hence, the soft resource ensures efficient use of the spectrum.

There are a host of signaling mechanisms happening between the CU of the donor node (100d) and DU of the child IAB node (100c) and also between the DU of the parent IAB node (100b) and MT of the child IAB node (100c). The central unit (CU) of the donor node (100d)

assign resources to DU of all the IAB nodes (100) through F1-AP (F1 Application Protocol) signaling and DU of the parent IAB node (100b) allocates resources to MT of the child IAB node (100c) through RRC (Radio Resource Control) signaling. Here, F1-AP interface provides means for interconnecting a CU and a DU of a gNB or an IAB node (100), whereas RRC is the control mechanism between DU of the parent IAB node (100b) and MT of the child IAB node (100c). In the case of soft resource, the signaling for indicating availability, i.e., IA is provided to the IAB child link from the parent IAB node (100b) when the parent link is not using the resource. The UL/DL control channel elements originally exchanged between the gNB and the UE (200) are also exchanged between the DU of the parent IAB node (100b) and MT of the child IAB node (100c). However, the signaling aspects for MT of the child IAB node (100c) should be reformed compared to the UE (200) because of reasons including:

IAB MT has higher capabilities compared to UE.

Resource partitioning between access and backhaul sets limitations on some control channel elements.

Therefore, the UL and DL control channel elements transmitted to the MT of the child IAB node (100c) from the parent IAB node (100b) should be modified accordingly. This is the major motivation for this invention.

OBJECT OF INVENTION

The principal object of the embodiments herein is to provide modifications in uplink and downlink signaling for an IAB node. The modifications either help to reduce the control channel payload or enable more flexible signaling of resources to improve efficient control channel scheduling, facilitate efficient sharing of resources among IAB nodes and also avoid conflicts that might arise due to discrepancies between semi-static and dynamic resource allocation.

BRIEF SUMMARY OF THE INVENTION

Accordingly, the embodiments herein provide a method for provisioning signalling in an Integrated Access Backhaul (IAB) network. The method includes detecting, by a parent IAB node, whether a conflict occurred between a resource configured at a Mobile Terminal (MT) of a child IAB node and a Distributed Unit (DU) of the child IAB node. Further, the method includes updating a time-domain allocation configuration of the MT of child IAB node based on a resource configuration of the DU of child IAB node in response to detecting that "the conflict is not occurred between the resource utilized at the MT of the child IAB node and the DU of the child IAB node". Further, the method includes sending an indication to the MT of the child IAB node to update the time domain allocation configuration and scheduling the MT of the child IAB node based on the updated time-domain allocation configuration.

Further, the method includes remapping an offset in a time domain allocation configuration of the MT of the child IAB node based on the resource configuration of the DU of the child IAB node in response to detecting that "the conflict is not occurred between the resource utilized at the MT of the child IAB node and the DU of the child IAB node". Further, the method includes sending an indication to the MT of the child IAB node to remap the offset in the time domain allocation configuration, and scheduling resource for MT of the child IAB node based on the remapped offset in the time domain allocation configuration.

Further, the method includes sending an indication to the MT of the child IAB node one of: discard one of reception of Downlink (DL) data and transmission of Uplink (UL) data, and delay one of reception of the DL data and transmission of the UL data in response to detecting that the conflict occurs between the resource utilized at the MT of the child IAB node and the DU of the child IAB node".

Accordingly, the embodiments herein provide a method for provisioning signalling in an Integrated Access Backhaul (IAB) network. The method includes detecting, by a mobile terminal (MT) of a child IAB node associated with a parent IAB node, whether a conflict occurred between a resource utilized at the MT of the child IAB node and the DU of the child IAB node. Further, the method includes receiving an indication from the parent IAB node to update the time domain allocation configuration in response to detecting that "the conflict does not occur between the resource utilized at the MT of the child IAB node and the DU of the child IAB node". Further, the method includes updating a size of a downlink control Information (DCI) based on the resource configuration of the DU of the child IAB node.

Further, the method includes receiving an indication from the parent IAB node, to remap an offset in the time domain allocation configuration in response to detecting that "the conflict does not occur between the resource utilized at the MT of the child IAB node and the DU of the child IAB node". Further, the method includes remapping the offset in a time domain allocation configuration of the child IAB node based on the resource configuration of the DU of the child IAB node, and receiving DL data or transmitting UL data based on the remapped offset in the time domain allocation configuration.

Further, the method includes receiving an indication from the parent IAB node, wherein the indication is for one of "discard reception of DL data or transmission of UL data", and "delay reception of the DL data or transmission of the UL data" in response to detecting that "the conflict occurs between the resource utilized at the MT of the child IAB node and the DU of the child IAB node". Further, the method includes performing one of: "discarding transmission of the UL data or reception of the DL data", and "delaying transmission of the UL data or reception of the DL data".

Accordingly, the embodiments herein provide a method for provisioning signalling in an Integrated Access Backhaul (IAB) network. The method includes configuring, by a central unit (CU) of a donor node, a plurality of search spaces (SS) and a number of physical downlink control channel (PDCCH) candidates for each aggregation level (AL) in every SS at the MT of the child IAB node. Further, the method includes configuring, by one of a distributed unit (DU) of a parent IAB node and the CU of the donor node, a scaling factor to the MT of the child IAB node, wherein the scaling factor is used to scale the number of PDCCH candidates for each AL in every SS while performing the blind decoding of a Downlink Control Information (DCI) at the MT of the child IAB node. Further, the method includes configuring, by the DU of the parent IAB node, a flag at the MT of the child IAB node, wherein the flag indicates whether to use the scaling factor while performing the blind decoding of the DCI at the MT of the child IAB node. Further, the method includes detecting, by the MT of the child IAB node, that a slot is configured for monitoring the DCI. Further, the method includes performing, by the MT of the child IAB node, the blind decoding of the DCI in the plurality of SS based on the scaling factor and the flag.

Accordingly, the embodiments herein provide a method for provisioning signalling in an Integrated Access Backhaul (IAB) network. The method includes determining, by the distributed unit (DU) of a parent IAB node, a resource is not utilized for communicating with a child IAB node. Further, the method includes signalling, by the DU of the parent IAB node, an indication of availability (IA) signal to the child IAB node for a set of consecutive slots, wherein the IA signal indicates the availability of each resource type of at least one slot of the set of consecutive slots, and wherein the set of consecutive slots is marked by a start slot index and an end slot index.

Accordingly, the embodiments herein provide a parent Integrated Access Backhaul (IAB) node. The parent IAB node includes a memory, a communicator, a processor, a payload controller, an offset controller, a transmission controller, a decoder, and an indication controller. The payload controller is configured to update a time-domain allocation configuration of the MT of child IAB node based on a resource configuration of the DU of child IAB node in response to detecting that "the conflict does not occur between the resource utilized at the MT of the child IAB node and the DU of the child IAB node". Further, the payload controller is configured to send an indication to the MT of the child IAB node to update the time domain allocation configuration. Further, the payload controller is configured to schedule the MT of the child IAB node based on the updated time-domain allocation configuration.

The offset controller is configured to remap the offset in a time domain allocation configuration of the MT of the child IAB node based on the resource configuration of the DU of the child IAB node in response to detecting that "the conflict does not occur between the resource utilized at the MT of the child IAB node and the DU of the child IAB node". Further, the offset controller is configured to send an indication to the MT of the child IAB node to remap the offset in the time domain allocation configuration. Further, the offset controller is configured to schedule resources for MT of the child IAB node based on the remapped offset in the time domain allocation configuration.

The transmission controller is configured to send an indication to the MT of the child IAB node one of: discard one of reception of Downlink (DL) data and transmission of Uplink (UL) data, and delay one of reception of the DL data and transmission of the UL data in response to detecting that "the conflict occurs between the resource utilized at the MT of the child IAB node and the DU of the child IAB node".

The decoder is configured to receive, configuration from a central unit (CU) of a donor node, a plurality of search spaces (SS), and a number of physical downlink control channel (PDCCH) candidates for each aggregation level (AL) in every SS at the MT of the child IAB node. Further, the decoder is configured to receive, configuration from one of a distributed unit (DU) of a parent IAB node and the CU of the donor node, a scaling factor to the MT of the child IAB node, wherein the scaling factor is used to scale the number of PDCCH candidates for each AL in every SS while performing the blind decoding of a Downlink Control Information (DCI) at the MT of the child IAB node. Further, the decoder is configured a flag at the MT of the child IAB node, wherein the flag indicating whether to use the scaling factor while performing the blind decoding of the DCI at the MT of the child IAB node.

The indication controller is configured to detect a resource that is not utilized for communicating with the child IAB node. Further, the indication controller is configured to signal an indication of availability (IA) signal to the child IAB node for a set of consecutive slots, where the IA signal indicate the availability of each resource type of the at least one slot of the set of consecutive slots, and wherein the set of consecutive slots is marked by a start slot index and an end slot index.

The indication controller is configured to one of "signalling the IA signal only to slots with S symbols from the set of consecutive slots at DU of the child IAB node, and signalling a slot index of the slots in which the IA is applicable", and "signalling the IA signal irrespective of one of H, S, NA configuration of resource at DU of the child IAB node".

The indication controller is configured to one of "signalling the availability of resource type in IA signal based on one of DL resource, UL resource, F resource configuration at DU of the child IAB node"; and "signalling the availability of resource type in IA signal irrespective of one of DL resource, UL resource, F resource configuration at DU of the child IAB node".

The indication controller is configured to one of "signalling the IA signal to the timing of MT of the child IAB node"; and "determining an actual duration of availability of resources at DU of the child IAB node, and signalling the IA signal for the actual duration of availability of the resources at DU of the child IAB node".

The indication controller is configured to one of "signalling the IA signal for slots which starts immediately after slots in which the IA is transmitted"; and "signalling the IA signal for slots which starts after a delay from slots in which the IA is transmitted, and signalling an offset between slot in which the IA is transmitted and slot from which the IA is applicable".

Accordingly, the embodiments herein provide a child Integrated Access Backhaul (IAB) node. The child IAB node includes a memory, a communicator, a processor, a payload controller, an offset controller, a transmission controller, a decoder, and an indication controller. The payload controller is configured to receive an indication from the parent IAB node to update the time domain allocation configuration in response to detecting that "the conflict does not occur between the resource utilized at the MT of the child IAB node and the DU of the child IAB node". Further, the payload controller is configured to update a size of a downlink control Information (DCI) based on the resource configuration of the DU of the child IAB node.

The offset controller is configured to receive an indication from the parent IAB node, to remap the offset in the time domain allocation configuration in response to detecting that "the conflict is not occurred between the resource utilized at the MT of the child IAB node and the DU of the child IAB node". Further, the offset controller is configured to remap offset in a time domain allocation configuration of the child IAB node based on the resource configuration of the DU of the child IAB node. Further, the offset controller is configured to receive DL data or transmitting UL data based on the remapped offset in the time domain allocation configuration.

The transmission controller is configured to receive an indication from the parent IAB node, wherein the indication is for one of "discard reception of DL data or transmission of UL data", and "delay reception of the DL data or transmission of the UL data" in response to detecting that "the conflict occurs between the resource utilized at the MT of the child IAB node and the DU of the child IAB node". Further, the transmission controller is configured to perform one of: "discarding transmission of the UL data or reception of the DL data", and "delaying transmission of the UL data or reception of the DL data".

The decoder is configured to detect that a slot is configured for monitoring the DCI. Further, the decoder is configured to determine whether the flag indicates to update the number of candidates for each of the AL. Further, the decoder is configured to monitor for the DCI in the plurality of SS with the configured number of PDCCH candidates for each of the AL in response to determining that the flag does not indicate to update the number of candidates for each of the AL. Further, the decoder is configured to update the number of PDCCH candidates for each of the AL in the plurality of SS based on the scaling factor in response to determining that the flag indicates to update the number of PDCCH candidates for each of the AL, and monitoring for the DCI in the plurality of SS with the updated number of candidates for each of the AL.

The indication controller is configured to perform one of "receiving by the child IAB node the IA signal from the parent IAB node, overriding a semi-static configuration of the H, S, NA configuration at the DU of the child IAB node based on the IA signal, scheduling by the DU of child IAB node the child or access link in a resource configured as H, S, NA based on the availability of resource type signalled by IA signal"; and "receiving by the child IAB node the IA signal from the parent IAB node, and applying by the DU of child IAB node the IA only for resource type configured as S".

Further, the indication controller is configured to perform one of "receiving by the child IAB node the IA signal from the parent IAB node, and utilizing by the DU of child IAB node the resource in the child or access link based on the availability of resource type signalled by IA signal"; and "receiving by the child IAB node the IA signal from the parent IAB node, and applying, by the DU of the child IAB node, the availability of resource type signalled in IA signal for scheduling the child or access link based on resource configuration".

Further, the indication controller is configured to perform one of "receiving by the child IAB node the IA signal from the parent IAB node, determining by the child IAB node an actual duration of availability of resources at DU of the child IAB node, and scheduling the child or access link based on the actual duration of availability of the resources at DU of the child IAB node", and "receiving by the child IAB node the IA signal from the parent IAB node and scheduling the child or access link based on the actual duration of availability of the resources indicated by the IA signal".

Further, the indication controller is configured to perform one of "receiving by the child IAB node the IA signal from the parent IAB node, and applying by the DU of the child IAB node IA from the slots which start immediately after slots in which the IA is received" and "receiving by the child IAB node the IA signal from the parent IAB node, and applying by the DU of the child IAB node IA after an offset from the slots in which the IA is received".

Further, the indication controller is configured to perform one of "receiving by the child IAB node the IA signal from the parent IAB node, and applying by the DU of the child IAB node IA starting from the earliest slot of the DU of the child IAB node which overlap with slot of the MT of the child IAB in which IA is received"; and "receiving by the child IAB node the IA signal from the parent IAB node, and applying by the DU of child IAB node IA starting from the earliest slot of the DU of the child IAB node which overlaps with symbols of the MT of the child IAB in which IA is received".

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF THE DRAWINGS

This method and system are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
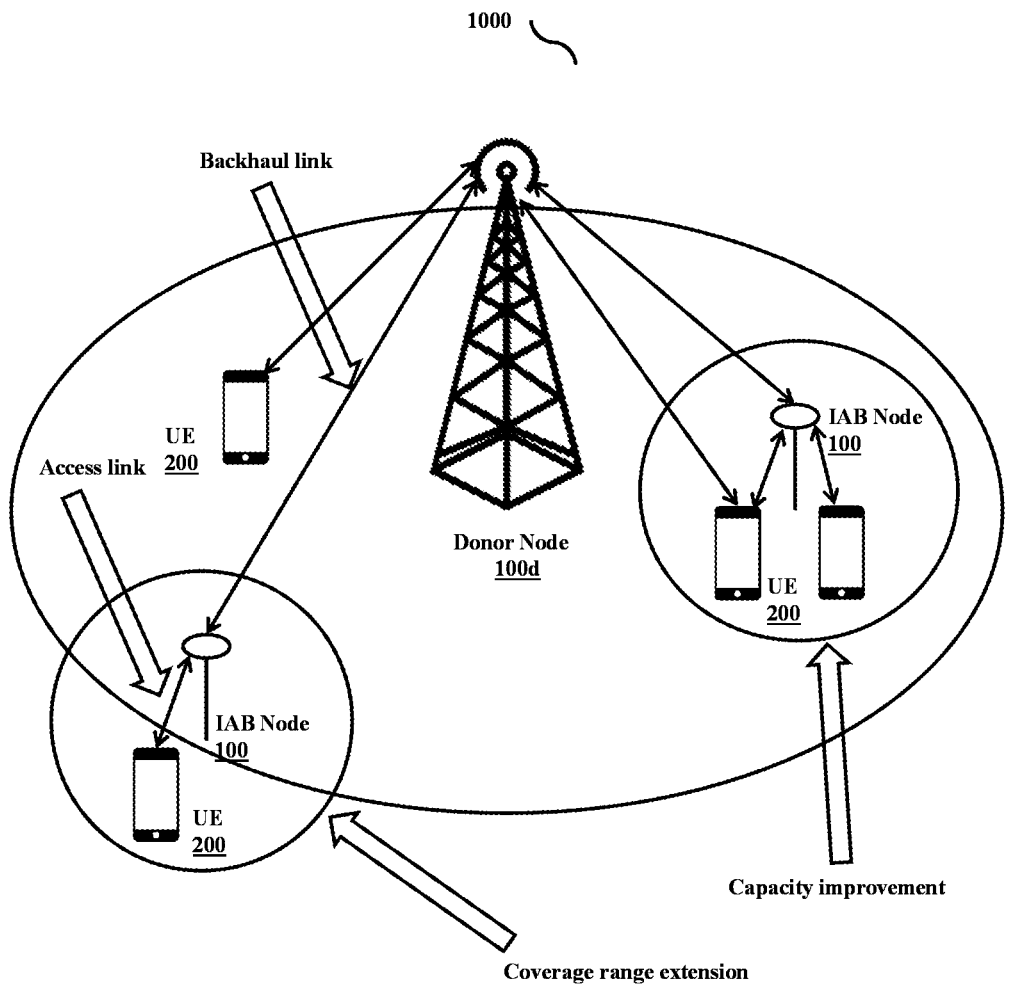
FIG. 1 illustrates a basic Integrated Access Backhaul (IAB) deployment and its use cases, according to a prior art.
Figure 2:
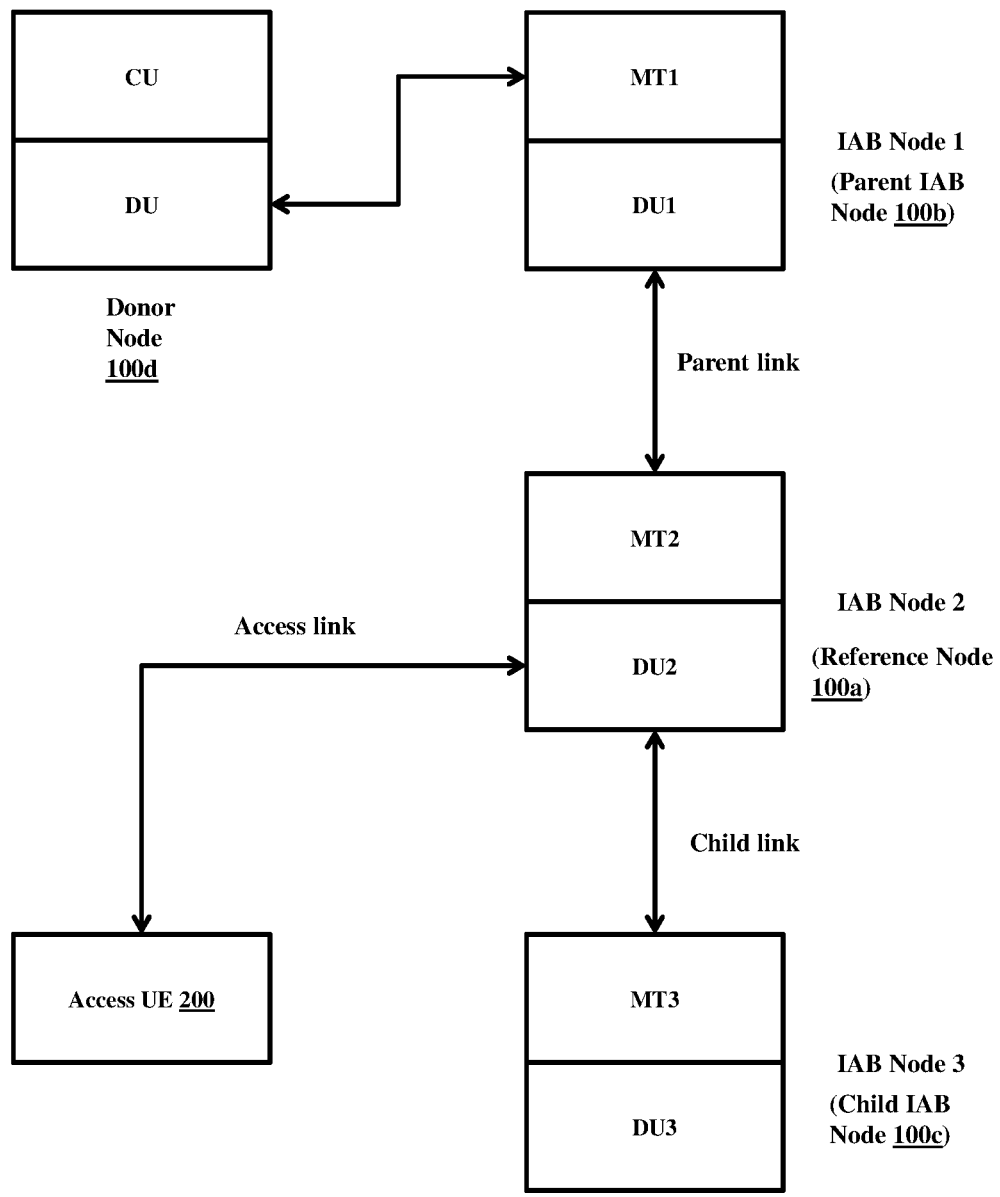
FIG. 2 illustrates a basic block diagram of a multi-hop IAB network, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The term parent DU and parent MT are used to representing the DU of the parent IAB node (100*b*) and MT of the parent IAB node (100*b*) respectively. Similarly, child DU and child MT are used to representing the DU of the child IAB node (100*c*) and MT of the child IAB node (100*c*) respectively. The term "MT of the IAB node" is used to representing at least one of "MT of the parent IAB node", "MT of the child IAB node", and "MT of the reference IAB node". The term "DU of the IAB node" is used to representing at least one of "DU of the parent IAB node", "DU of the child IAB node", and "DU of the reference IAB node".

Accordingly, embodiments herein achieve signaling method and system for provisioning signalling in an Integrated Access Backhaul (IAB) network. The method includes providing a set of modifications in uplink and downlink signaling for the IAB node. The modifications either help to reduce the control channel payload or enable more flexible signaling of resources, improve efficient control channel scheduling and also avoid conflicts that might arise due to discrepancies between semi-static and dynamic resource allocation.

Referring now to the drawings, and more particularly to FIGS. 3 through 18, there are shown preferred embodiments.

Figure 3:
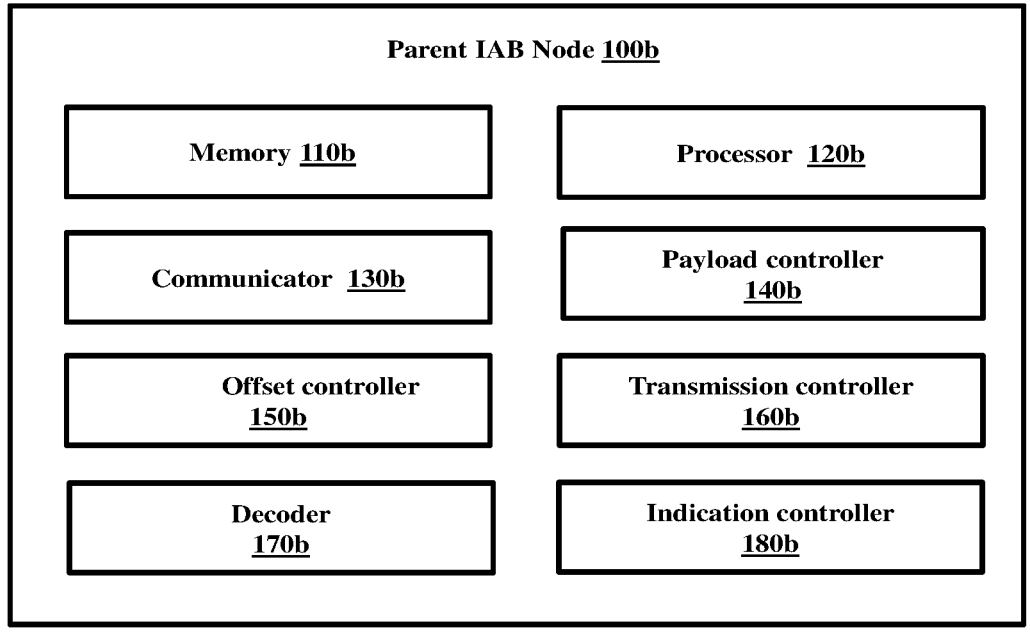
FIG. 3 is a block diagram of a parent IAB node for provisioning signalling in an IAB network, according to an embodiment as disclosed herein.

FIG. 3 is a block diagram of a parent IAB node (100*b*) for provisioning signalling in an IAB network (1000), according to an embodiment as disclosed herein.

In an embodiment, the parent IAB node (100*b*) includes a memory (110*b*), a processor (120*b*), a communicator (130*b*), a payload controller (140*b*), an offset controller (150*b*), a transmission controller (160*b*), a decoder (170*b*), and an indication controller (180*b*). The payload controller (140*b*), the offset controller (150*b*), the transmission controller (160*b*), the decoder (170*b*), and the indication controller (180*b*) are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The memory (110b) also stores instructions to be executed by the processor (120b). The memory (110b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110b) may, in some examples, be considered a non-transitory storage medium. The term "non-transitory" may indicate that the storage medium is not embodied in a carrier wave or a propagated signal. However, the term "non-transitory" should not be interpreted that the memory (110b) is non-movable. In some examples, the memory (110b) can be configured to store larger amounts of information than the memory. In certain examples, a non-transitory storage medium may store data that can, over time, change (e.g., in Random Access Memory (RAM) or cache). The memory (110b) can be an internal storage unit or it can be an external storage unit of the parent IAB node (100b), a cloud storage, or any other type of external storage.

The processor (120b) communicates with the memory (110b), the communicator (130b), the payload controller (140b), the offset controller (150b), the transmission controller (160b), the decoder (170b), and the indication controller (180b). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). The communicator (130b) is configured for communicating internally between internal hardware components and with external devices via one or more networks. The memory (110b) stores a time domain allocation configuration and other configurations in the parent IAB node (100b).

In an embodiment, the parent IAB node (100b) receives information about one of the resource configuration and configuration of cell-specific signals/channels of the DU of the child IAB node (100c) from one of: the MT of the child IAB node (100c) and a central unit (CU) of a donor node (100d). Further, the parent IAB node (100b) detects whether a conflict occurred between a resource configured at a Mobile Terminal (MT) of a child IAB node (100c) and a Distributed Unit (DU) of the child IAB node (100c).

The payload controller (140b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the payload controller (140b) updates a time-domain allocation configuration of the MT of child IAB node (100c) based on a resource configuration of the DU of child IAB node (100c). Further, the payload controller (140b) sends an indication to the MT of the child IAB node (100c) to update the time domain allocation configuration. Further, the payload controller (140b) schedules the MT of the child IAB node (100c) based on the updated time-domain allocation configuration.

Further, the payload controller (140b) configures the time domain allocation configuration to the MT of the child IAB node (100c), wherein the time domain allocation configuration comprises a plurality of offsets, wherein each of the offsets represents a number of slots between one of "a DL control channel and a DL data channel", "a DL data channel and UL control channel", and "a DL control channel and a UL data channel". Further, the payload controller (140b) identifies the resource configured as one of hard and for "one of transmission and reception of cell-specific signal/channel" based on the resource configuration of the DU of the child IAB node (100c). Further, the payload controller (140b) determines a offset from the plurality of offsets corresponding to the resource configured as one of the hard and for "one of transmission and reception of cell-specific signal/channel". Further, the payload controller (140b) updates the time domain allocation configuration by removing entries corresponding to the offset from the time domain allocation configuration.

The offset controller (150b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the offset controller (150b) remaps offset in a time domain allocation configuration of the MT of the child IAB node (100c) based on the resource configuration of the DU of the child IAB node (100c) in response to detecting that "the conflict is not occurred between the resource utilized at the MT of the child IAB node (100c) and the DU of the child IAB node (100c)". Further, the offset controller (150b) sends an indication to the MT of the child IAB node (100c) to remap offset in the time domain allocation configuration. Further, the offset controller (150b) schedules resource for MT of the child IAB node (100c) based on the remapped offset in the time domain allocation configuration.

Further, the offset controller (150b) configures the time domain allocation configuration to the MT of the child IAB node (100c), wherein the time domain allocation configuration comprises a plurality of offsets, wherein each of the offsets represents a number of slots between one of "a DL control channel and a DL data channel", "a DL data channel and UL control channel", and "a DL control channel and an UL data channel". Further, the offset controller (150b) identifies resource configured as one of hard and for "one of transmission and reception of cell-specific signal/channel" based on the resource configuration of the DU of the child IAB node (100c). Further, the offset controller (150b) determines the offset from the plurality of offsets corresponding to the resource configured as one of hard and for "one of transmission and reception of cell-specific signal/channel". Further, the offset controller (150b) remaps the offset in the time domain allocation configuration based on the resource configuration of the DU of the child IAB node (100c) by ignoring the resource configured as one of hard and for "one of transmission and reception of cell-specific signal/channel.

The transmission controller (160b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the transmission controller (160b) sends an indication to the MT of the child IAB node (100c) one of: discarding one of reception of Downlink (DL) data and transmission of Uplink (UL) data, and delay one of reception of the DL data and transmission of the UL data in response to detecting that "the conflict occurs between the resource utilized at the MT of the child IAB node (100c) and the DU of the child IAB node (100c)".

Further, the transmission controller (160b) determines that the DU of the child IAB node (100c): "is configured as one of soft and NA", and "has to perform one of transmission and reception of cell-specific channels/signals", and the MT of the child IAB node (100c) is scheduled to perform one of transmission and reception. Further, the transmission controller (160b) determines that the DU of the child IAB node (100c) is configured as hard and the MT of the child IAB node (100c) is scheduled to perform one of transmission and reception. Further, the transmission controller (160b) detects the occurrence of the conflict between resource configured at the MT of the child IAB node (100c) and the DU of the child IAB node (100c).

The decoder (170b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the decoder (170b) receives configuration, from the CU of the donor node (100d), a plurality of search spaces (SS), and a number of physical downlink control channel (PDCCH) candidates for each aggregation level (AL) in every SS at the MT of the child IAB node (100c). Further, the decoder (170b) configures a scaling factor to the MT of the child IAB node (100c), wherein the scaling factor is used to scale the number of PDCCH candidates for each AL in every SS while performing the blind decoding of a Downlink Control Information (DCI) at the MT of the child IAB node (100c) Further, the decoder (170b) configures a flag at the MT of the child IAB node (100c), wherein the flag indicating whether to use the scaling factor while performing the blind decoding of the DCI at the MT of the child IAB node (100c).

The indication controller (180b) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the indication controller (180b) determines a resource is not utilized for communicating with child IAB node (100c). Further, the indication controller (180b) signals an indication of availability (IA) signal to the child IAB node (100c) for a set of consecutive slots, wherein the IA signal indicates the availability of each resource type of at least one slot of the set of consecutive slots, and wherein the set of consecutive slots is marked by a start slot index and an end slot index. The resource type comprises a downlink (DL) resource, an uplink (UL) resource, and a Flexible (F) resource, and wherein the DL resource, UL resource, and flexible (F) resource are configured as one of hard (H), soft (S), and not available (NA).

Further, the indication controller (180b) performs one of "signalling the IA signal only to slots with S symbols from the set of consecutive slots at DU of the child IAB node (100c), and signalling a slot index of the slots in which the IA is applicable", and "signalling the IA signal irrespective of one of H, S, NA configuration of resource at DU of the child IAB node (100c)". Further, the indication controller (180b) performs one of "signalling the availability of resource type in IA signal based on one of DL resource, UL resource, F resource configuration at DU of the child IAB node (100c)"; and "signalling the availability of resource type in IA signal irrespective of one of DL resource, UL resource, F resource configuration at DU of the child IAB node (100c)". Further, the indication controller (180b) performs one of "signalling the IA signal with respect to timing of MT of the child IAB node (100c)"; and "determining an actual duration of availability of resources at DU of the child IAB node (100c), and signalling the IA signal with respect to actual duration of availability of the resources at DU of the child IAB node (100c)". Further, the indication controller (180b) performs one of "signalling the IA signal for slots which starts immediately after slots in which the IA is transmitted"; and "signalling the IA signal for slots which starts after a delay from slots in which the IA is transmitted, and signalling an offset between slot in which the IA is transmitted and slot from which the IA is applicable".

The actual duration is determined based on one of a resource configuration of MT of the child IAB node (100c) and the DU of the child IAB node (100c) in one of current, previous, and upcoming slots, and parameters associated with transmission or reception at the child IAB node (100c). The parameters associated with transmission or reception at the child IAB node (100c) comprises one of a propagation delay in backhaul link of the child IAB node (100c), a timing advance (TA) used by the MT of the child IAB node (100c) for UL-Tx, a TA signaled by the child IAB node (100c) to associated child IAB node (100c) or access UEs, and a propagation delay in child or access link of the child IAB node (100c).

Although the FIG. 3 shows various hardware components of the parent IAB node (100b) but it is to be understood that other embodiments are not limited thereon. In other embodiments, the parent IAB node (100b) may include less or more number of components. Further, the labels or names of the components are used only for illustrative purpose and does not limit the scope of the invention. One or more components can be combined together to perform same or substantially similar function to provision signalling in an Integrated Access Backhaul (IAB) network (1000).

Figure 4:
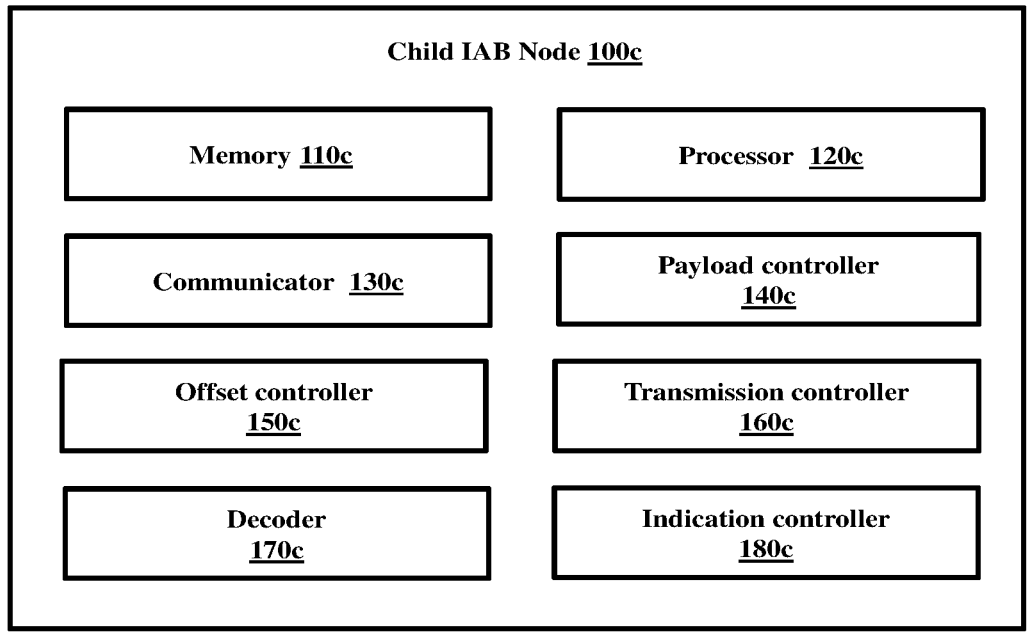
FIG. 4 is a block diagram of a child IAB node for provisioning signalling in the IAB network, according to an embodiment as disclosed herein.

FIG. 4 is a block diagram of the child IAB node (100c) for provisioning signalling in the IAB network (1000), according to an embodiment as disclosed herein.

In an embodiment, the child IAB node (100c) includes a memory (110c), a processor (120c), a communicator (130c), a payload controller (140c), an offset controller (150c), a transmission controller (160c), a decoder (170c), and an indication controller (180c). The payload controller (140c), the offset controller (150c), the transmission controller (160c), the decoder (170c), and the indication controller (180c) are implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The memory (110c) also stores instructions to be executed by the processor (120c). The memory (110c) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110c) may, in some examples, be considered a non-transitory storage medium. The term "non-transitory" may indicate that the storage medium is not embodied in a carrier wave or a propagated signal. However, the term "non-transitory" should not be interpreted that the memory (110c) is non-movable. In some examples, the memory (110c) can be configured to store larger amounts of information than the memory. In certain examples, a non-transitory storage medium may store data that can, over time, change (e.g., in Random Access Memory (RAM) or cache). The memory (110c) can be an internal storage unit or it can be an external storage unit of the parent IAB node (100b), a cloud storage, or any other type of external storage. The memory (110c) stores a time domain allocation configuration and other configurations in the child IAB node (100c).

The processor (120c) communicates with the memory (110c), the communicator (130c), the payload controller (140c), the offset controller (150c), the transmission controller (160c), the decoder (170c), and the indication controller (180c). The processor (120) is configured to execute instructions stored in the memory (110) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU). The communicator (130c) is configured for communicating internally between internal hardware components and with external devices via one or more networks.

In an embodiment, the child IAB node (100c) detects whether a conflict occurred between resource utilized at the MT of the child IAB node (100c) and the DU of the child IAB node (100c), where the MT of the child IAB node (100c) associated with the parent IAB node (100b).

The payload controller (140c) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the payload controller (140c) receives an indication from the parent IAB node (100b) to update the time domain allocation configuration in response to detecting that "the conflict does not occur between the resource utilized at the MT of the child IAB node (100c) and the DU of the child IAB node (100c)". Further, the payload controller (140c) updates a size of a downlink (DL) control Information (DCI) based on the resource configuration of the DU of the child IAB node (100c).

Further, the payload controller (140c) receives the time domain allocation configuration from the parent IAB node (100b) wherein the time domain allocation configuration comprises a plurality of offsets, wherein each of the offsets represents a number of slots between one of "a DL control channel and a DL data channel", "a DL data channel and UL control channel", and "a DL control channel and an UL data channel". Further, the payload controller (140c) identifies resource configured as one of hard and for "one of transmission and reception of cell-specific signal/channel" based on the resource configuration of the DU of the child IAB node (100c). Further, the payload controller (140c) determines offset from the plurality of offsets corresponding to the resource configured as one of hard and for "one of transmission and reception of cell-specific signal/channel". Further, the payload controller (140c) updates the time domain allocation configuration by removing entries corresponding to the offset from the time domain allocation configuration. Further, the payload controller (140c) determines the size of the DCI that schedules one of DL and UL based on the updated time-domain allocation configuration.

The offset controller (150c) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the offset controller (150c) receives an indication from the parent IAB node (100b), to remap offset in the time domain allocation configuration in response to detecting that "the conflict does not occur between the resource utilized at the MT of the child IAB node (100c) and the DU of the child IAB node (100c)". Further, the offset controller (150c) remaps offset in a time domain allocation configuration of the child IAB node (100c) based on the resource configuration of the DU of the child IAB node (100c). Further, the offset controller (150c) receives DL data or transmitting based on the remapped offset in the time domain allocation configuration.

Further, the offset controller (150c) receives the time domain allocation configuration from the parent IAB node (100b), wherein the time domain allocation configuration comprises a plurality of offsets, wherein each of the offsets represents a number of slots between one of "a DL control channel and a DL data channel", "a DL data channel and UL control channel", and "a DL control channel and an UL data channel". Further, the offset controller (150c) identifies resource configured as one of hard and for "one of transmission and reception of cell-specific signal/channel" based on the resource configuration of the DU of the child IAB node (100c). Further, the offset controller (150c) determines the offset from the plurality of offsets corresponding to the resource configured as one of hard and for "one of transmission and reception of cell-specific signal/channel". Further, the offset controller (150c) remaps the offset in the time domain allocation configuration based on the resource configuration of the DU of the child IAB node (100c) by ignoring the resource configured as one of hard and for "one of transmission and reception of cell-specific signal/channel".

The transmission controller (160c) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the transmission controller (160c) receives an indication from the parent IAB node (100b), wherein the indication is for one of "discard reception of DL data or transmission of UL data", and "delay reception of the DL data or transmission of the UL data" in response to detecting that "the conflict occurs between the resource utilized at the MT of the child IAB node (100c) and the DU of the child IAB node (100c)". Further, the transmission controller (160c) performs one of: "discarding transmission of the UL data or reception of the DL data", and "delaying transmission of the UL data or reception of the DL data".

Further, the transmission controller (160c) receives a DCI that schedules of: transmission of the UL data and reception of the DL data. Further, the transmission controller (160c) prepares for the reception of DL data or transmission of the UL data. Further, the transmission controller (160c) receives an indication from the parent IAB node (100b). Further, the transmission controller (160c) detects whether the indication is one of: discard one of reception of the DL data and transmission of the UL data and delay one of reception of the DL data and transmission of the UL data. Further, the transmission controller (160c) discards the reception of the DL data or transmission of the UL data in response to detecting that the indication is discarded reception of DL data or transmission of UL data. Further, the transmission controller (160c) delays the reception of the DL data and transmission of the UL data in response to detecting that the indication is delay reception of the DL data or transmission of the UL data.

The decoder (170c) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the decoder (170c) detects that a slot is configured for monitoring the DCI. Further, the decoder (170c) performs the blind decoding of the DCI in the plurality of SS based on the scaling factor and the flag.

Further, the decoder (170c) determines whether the flag indicates to update the number of candidates for each of the AL. Further, the decoder (170c) monitors for the DCI in the plurality of SS with the configured number of PDCCH candidates for each of the AL in response to determining that the flag does not indicate to update the number of candidates for each of the AL. Further, the decoder (170c) updates the number of PDCCH candidates for each of the AL in the plurality of SS based on the scaling factor in response to determining that the flag indicates to update the number of PDCCH candidates for each of the AL, and monitoring for the DCI in the plurality of SS with the increased number of candidates for each of the AL.

The indication controller (180c) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the indication controller (180c) performs one of "receiving the IA signal from the parent IAB node (100b), overriding a semi-static configuration of the H, S, NA configuration at the DU of the child IAB node (100c) based on the IA signal, utilizing by the DU of the child IAB node (100c) the resource in the child or access link based on the availability of resource type signalled by IA signal"; and "receiving by the child IAB node (100c) the IA signal from the parent IAB node (100b), and apply by the DU of the child IAB node (100c) the IA only for resource type configured as S".

Further, the indication controller (180c) performs one of "receiving the IA signal from the parent IAB node (100b), and utilizing by the DU of the child IAB node (100c) the resource in the child or access link based on the availability of resource type signalled by IA signal"; and "receiving by the child IAB node (100c) the IA signal from the parent IAB node (100b), and applying, by the DU of the child IAB node (100c), the availability of resource type signalled in IA signal for scheduling the child or access link based on resource configuration"

Further, the indication controller (180c) performs one of "receiving the IA signal from the parent IAB node (100b), determining by the child IAB node (100c) an actual duration of availability of resources at DU of the child IAB node (100c), and scheduling the child or access link based on the actual duration of availability of the resources at DU of the child IAB node (100c)", and "receiving by the child IAB node (100c) the IA signal from the parent IAB node (100b) and scheduling the child or access link based on the actual duration of availability of the resources indicated by the IA signal".

Further, the indication controller (180c) performs one of "receiving the IA signal from the parent IAB node (100b), and applying by the DU of the child IAB node (100c) IA from the slots which starts immediately after slots in which the IA is received" and "receiving by the child IAB node (100c) the IA signal from the parent IAB node (100b), and applying by the DU of the child IAB node (100c) IA after an offset from the slots in which the IA is received".

Further, the indication controller (180c) performs one of "receiving the IA signal from the parent IAB node (100b), and applying by the DU of the child IAB node (100c) IA starting from the earliest slot of the DU of the child IAB node (100c) which overlap with slot of the MT of the child IAB in which IA is received"; and "receiving by the child IAB node (100c) the IA signal from the parent IAB node (100b), and applying by the DU of the child IAB node (100c) IA starting from the earliest slot of the DU of the child IAB node (100c) which overlap with symbols of the MT of the child IAB in which IA is received".

The actual duration is determined based on one of a resource configuration of MT of the child IAB node (100c) and the DU of the child IAB node (100c) in one of current, previous, and upcoming slots, and parameters associated with Tx/Rx at the child IAB node (100c). The parameters associated with Tx/Rx at the child IAB nod comprises one of a propagation delay in backhaul link of the child IAB node (100c), a TA used by the MT of the child IAB node (100c) for UL-Tx, a TA signaled by the child IAB node (100c) to associated child IAB node (100c)s or access UEs, and a propagation delay in child or access link of the child IAB node (100c).

Although the FIG. 4 shows various hardware components of the child IAB node (100c) but it is to be understood that other embodiments are not limited thereon. In other embodiments, the child IAB node (100c) may include less or more number of components. Further, the labels or names of the components are used only for illustrative purpose and does not limit the scope of the invention. One or more components can be combined together to perform same or substantially similar function to provision signalling in an Integrated Access Backhaul (IAB) network (1000).

Figure 5A:
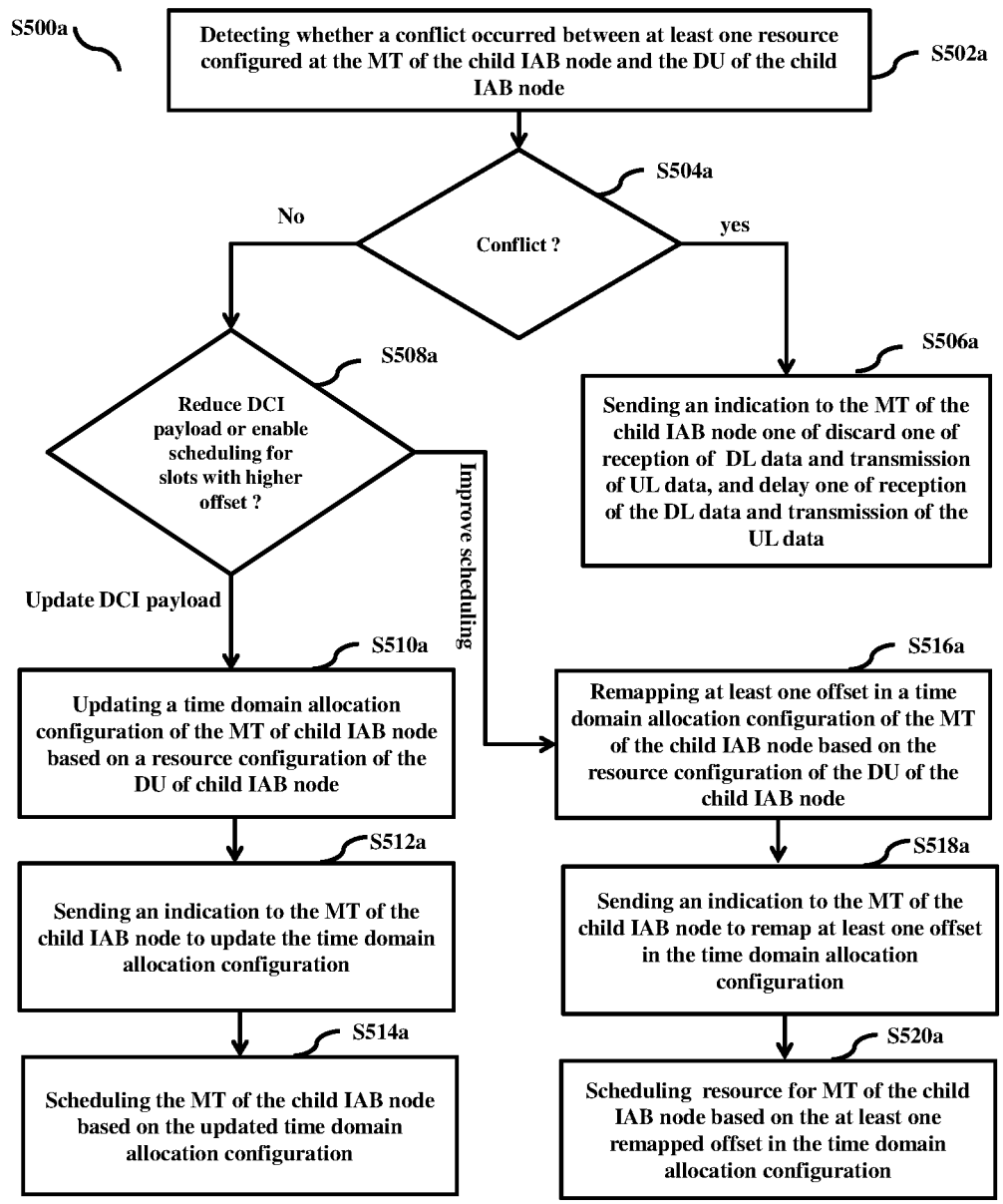
FIG. 5A is a flow diagram illustrating a method for provisioning signalling for the parent IAB node in the IAB network to reduce a control channel payload or enable more flexible signaling of resources to improve efficient control channel scheduling and avoid conflicts that might arise due to discrepancies between semi-static and dynamic resource allocation, according to an embodiment as disclosed herein.

FIG. 5A is a flow diagram (S500a) illustrating a method for provisioning signalling for the parent node (100b) in the IAB network (1000) to reduce a control channel payload or enable more flexible signaling of resources to improve efficient control channel scheduling and avoid conflicts that might arise due to discrepancies between semi-static and dynamic resource allocation, according to an embodiment as disclosed herein. The operations (S502a-S520a) are performed by the IAB node (100).

At S502a-S504a, the method includes detecting whether the conflict occurred between resource configured at the MT of the child IAB node (100c) and the DU of the child IAB node (100c). At S506a, the method includes sending the indication to the MT of the child IAB node (100c) one of: discarding one of reception of DL data and transmission of UL data, and delay one of reception of the DL data and transmission of the UL data in response to detecting that conflict occurred between resource configured at the MT of the child IAB node (100c) and the DU of the child IAB node (100c).

At S508a, the method includes selecting mechanisms, where the MT of the child IAB node (100c) has mechanisms for both the methods (i.e. reduce the payload for the DCI, improve the scheduling flexibility) at the MT of the child IAB node (100c embedded in it and the parent IAB node (100b) is aware of the availability of both the methods). In this case, a suitable method is selected dynamically. The selection of the method is performed at the DU of the parent IAB node (100b). If the parent IAB node (100b) aims to reduce the payload for the DCI and thereby improve the quality of DCI, then the DU of the parent IAB node (100b) chooses the method to reduce the control channel payload (S510a). If the DU of the parent IAB node (100b) aims to improve the scheduling flexibility, i.e., if the DU of the parent IAB node (100b) needs to schedule either DL data or UL data at the slots which are at a higher offset from the slot containing DCI, then the DU of the parent IAB node (100b) choose the method to enable more flexible signaling of resources, improve efficient control channel scheduling (S516a). The selected method is indicated to the MT of the child IAB node (100c) using a single bit "Offset_Indication_Selection" flag either in DCI or in higher layer signaling.

At S510a, the method includes updating the time domain allocation configuration of the MT of child IAB node (100c) based on the resource configuration of the DU of child IAB node (100c). At S512a, the method includes sending the indication to the MT of the child IAB node (100c) to update the time domain allocation configuration. At S514a, the method includes scheduling the MT of the child IAB node (100c) based on the updated time-domain allocation configuration.

At S516a, the method includes remapping offset in the time domain allocation configuration of the MT of the child IAB node (100c) based on the resource configuration of the DU of the child IAB node (100c). At S518a, the method includes sending the indication to the MT of the child IAB node (100c) to remap offset in the time domain allocation configuration. At S520a, the method includes scheduling resource for MT of the child IAB node (100c) based on the remapped offset in the time domain allocation configuration.

The various actions, acts, blocks, steps, or the like in the flow diagram (S500a) may be performed in the order presented, in a different order, or simultaneously. Further, in some embodiments, some of the actions, acts, blocks, steps, or the like may be omitted, added, modified, skipped, or the like without departing from the scope of the invention.

Figure 5B:
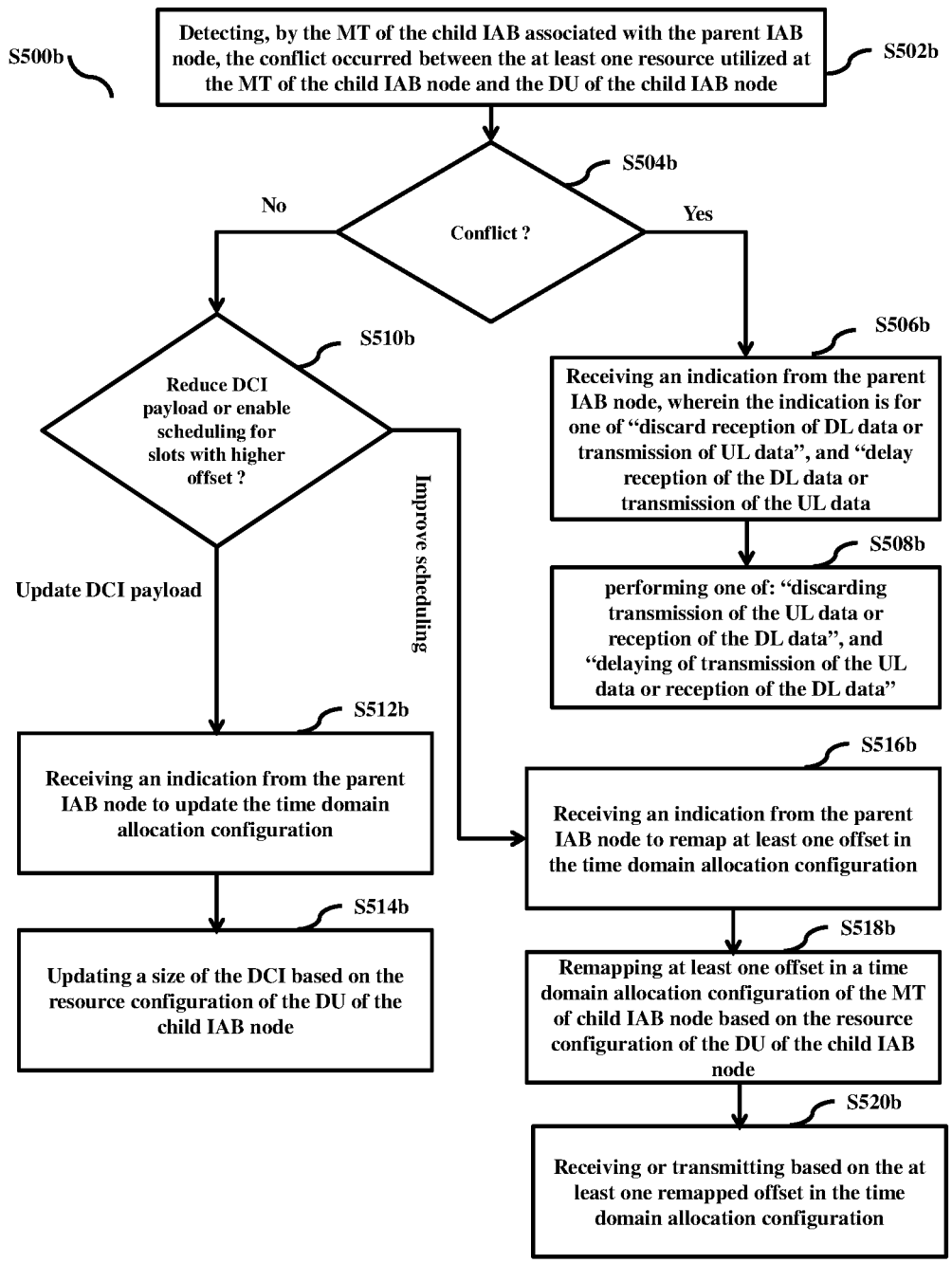
FIG. 5B is a flow diagram illustrating a method for provisioning signalling for the child IAB node in the IAB network to reduce a control channel payload or enable more flexible signaling of resources to improve efficient control channel scheduling and avoid conflicts that might arise due to discrepancies between semi-static and dynamic resource allocation, according to an embodiment as disclosed herein.

FIG. 5B is a flow diagram (S500b) illustrating a method for provisioning signalling for the child IAB node (100c) in the IAB network (1000) to reduce a control channel payload or enable more flexible signaling of resources to improve efficient control channel scheduling and avoid conflicts that might arise due to discrepancies between semi-static and dynamic resource allocation, according to an embodiment as disclosed herein.

At S502b-S504b, the method includes detecting, by the MT of the child IAB node (100c) associated with the parent IAB node (100b), whether the conflict occurred between at least one resource utilized at the MT of the child IAB node (100c) and the DU of the child IAB node (100c). At S506b, the method includes receiving an indication from the parent IAB node (100b), wherein the indication is for one of "discard reception of DL data or transmission of UL data", and "delay reception of the DL data or transmission of the UL data" in response to detecting that "the conflict is occurred between the at least one resource utilized at the MT of the child IAB node (100c) and the DU of the child IAB node (100c)". At S508b, the method includes performing one of: "discarding transmission of the UL data or reception of the DL data", and "delaying transmission of the UL data or reception of the DL data".

At S510b, the method includes selecting mechanisms, where the MT of the child IAB node (100c) has mechanisms for both the methods (i.e. reduce the payload for the DCI, improve the scheduling flexibility) at the MT of the child IAB node (100c embedded in it and the parent IAB node (100b) is aware of the availability of both the methods). In this case, a suitable method is selected dynamically. The selection of the method is performed at the DU of the parent IAB node (100b). If the parent IAB node (100b) aims to reduce the payload for the DCI and thereby improve the quality of DCI, then the DU of the parent IAB node (100b) chooses the method to reduce the control channel payload. If the DU of the parent IAB node (100b) aims to improve the scheduling flexibility, i.e., if the DU of the parent IAB node (100b) needs to schedule either DL data or UL data at the slots which are at the higher offset from the slot containing DCI, then the DU of the parent IAB node (100b) choose the method to enable more flexible signaling of resources, improve efficient control channel scheduling. The selected method is indicated to the MT of the child IAB node (100c) using the single bit "Offset_Indication_Selection" flag either in DCI or in higher layer signaling.

At S512b, the method includes receiving an indication from the parent IAB node (100b) to update the time domain allocation configuration in response to detecting that "the conflict is not occurred between the at least one resource utilized at the MT of the child IAB node (100c) and the DU of the child IAB node (100c)". At S514b, the method includes updating a size of the DCI based on the resource configuration of the DU of the child IAB node (100c).

At S516b, the method includes receiving an indication from the parent IAB node (100b) to remap at least one offset in the time domain allocation configuration. At S518b, the method includes remapping at least one offset in a time domain allocation configuration of the child IAB node (100c) based on the resource configuration of the DU of the child IAB node (100c). At S520b, the method includes receiving DL data or transmitting based on the at least one remapped offset in the time domain allocation configuration.

The various actions, acts, blocks, steps, or the like in the flow diagram (S500b) may be performed in the order presented, in a different order, or simultaneously. Further, in some embodiments, some of the actions, acts, blocks, steps, or the like may be omitted, added, modified, skipped, or the like without departing from the scope of the invention.

Figure 6A:
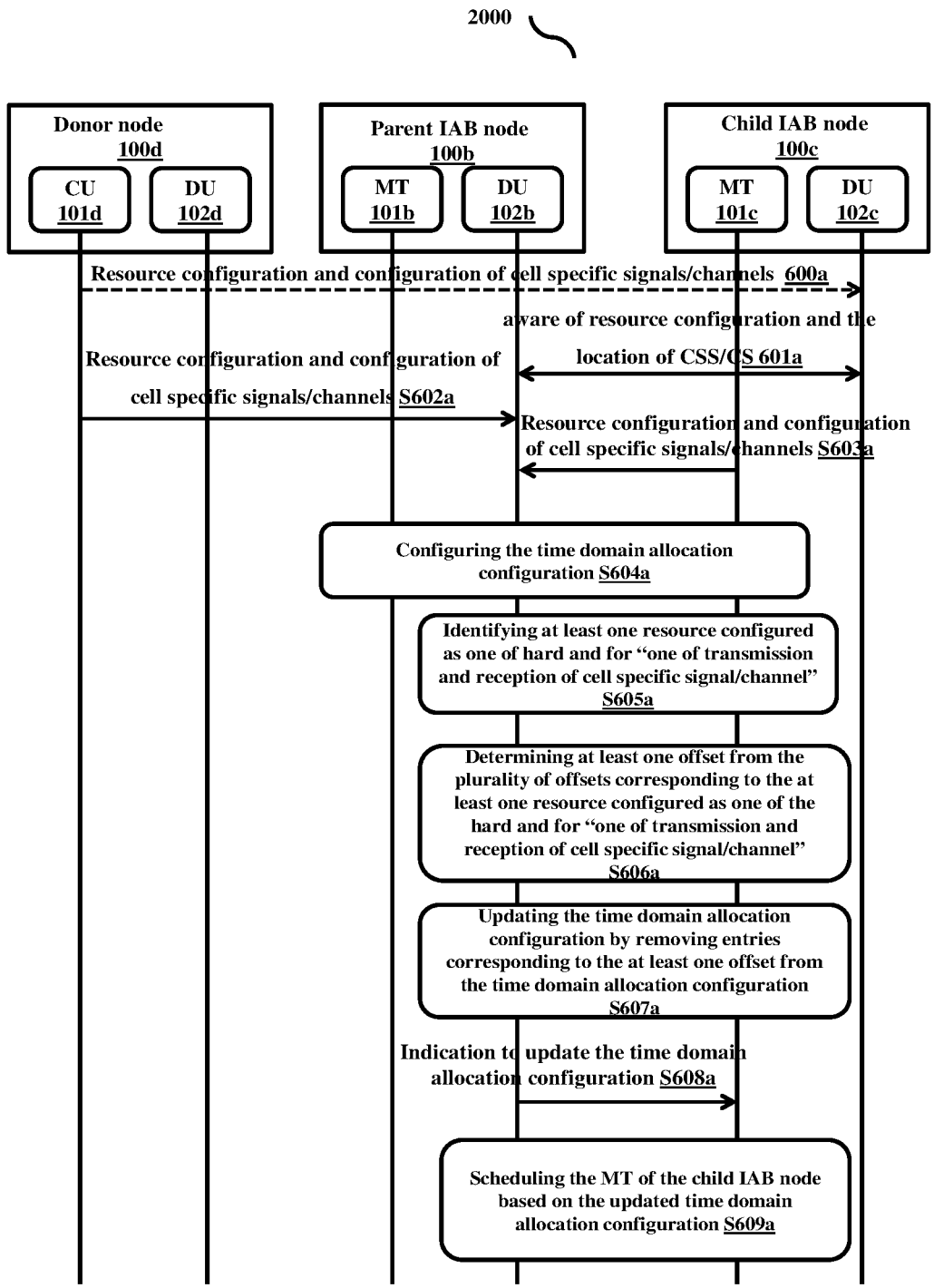
FIGS. 6A-6C are sequence flow diagrams illustrating a method for provisioning signalling in the IAB network to reduce a control channel payload or enable more flexible signaling of resources to improve efficient control channel scheduling and avoid conflicts that might arise due to discrepancies between semi-static and dynamic resource allocation, according to an embodiment as disclosed herein.
Figure 6B:
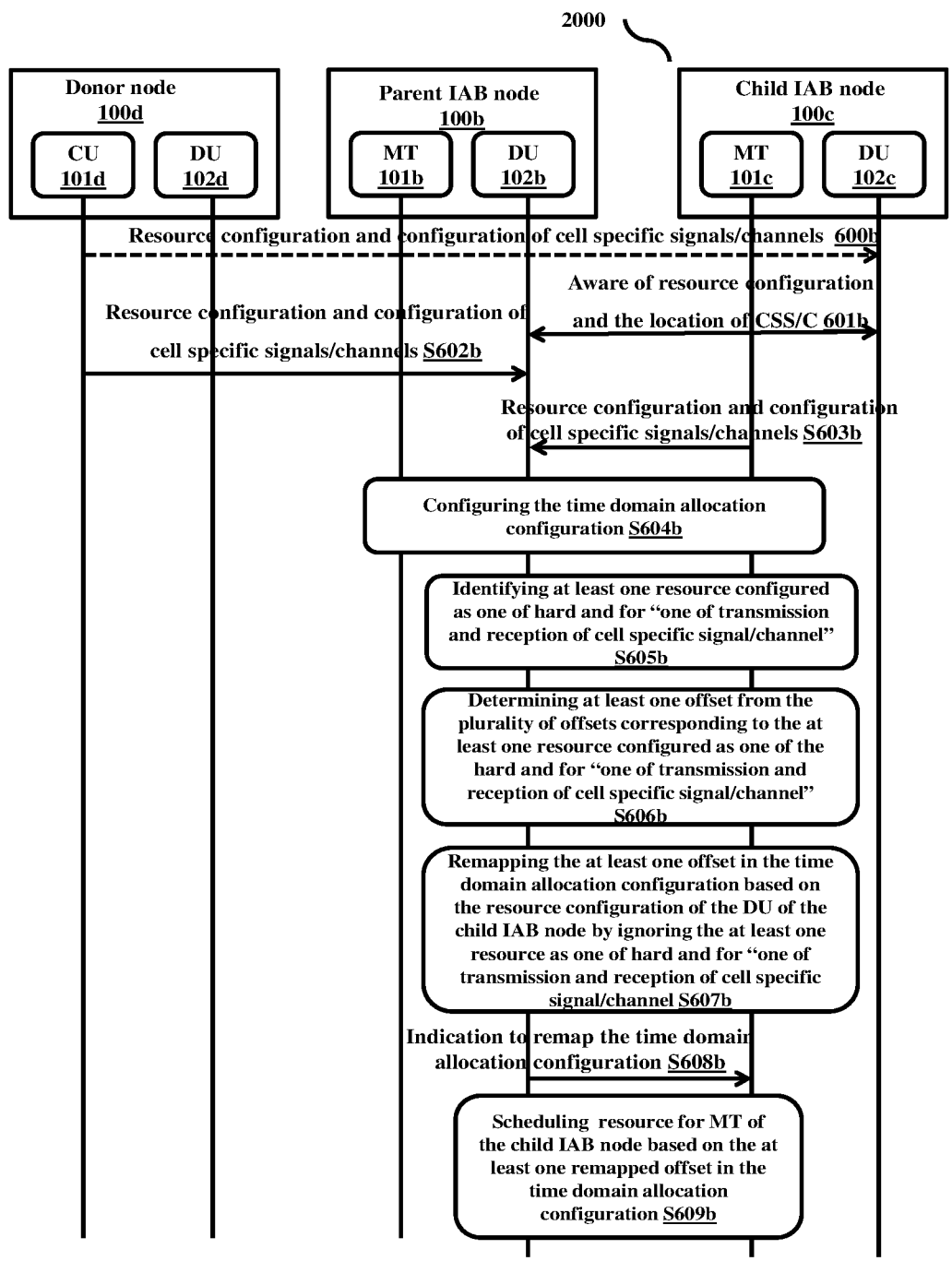
Figure 6C:
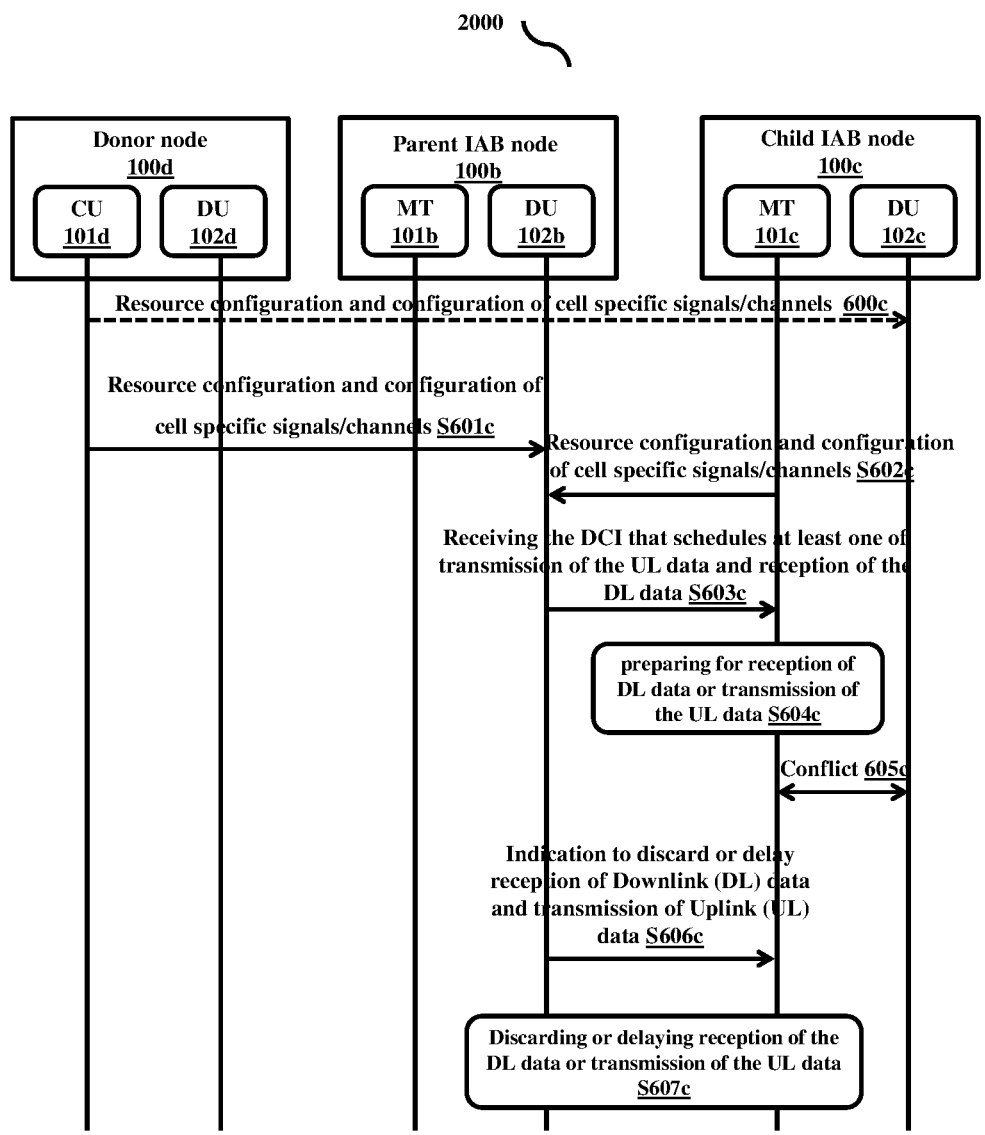

FIGS. 6A-6C are sequence flow diagrams illustrating a method for provisioning signalling in the IAB network (1000) to reduce a control channel payload or enable more flexible signaling of resources to improve efficient control channel scheduling and avoid conflicts that might arise due to discrepancies between semi-static and dynamic resource allocation, according to an embodiment as disclosed herein.

Referring to FIG. 6A: At S600a, sending, by the CU of the donor node (100d), the resource configuration and configuration of cell specific signals/channels to the DU of the child IAB node (100c). At S601a, the DU of the parent IAB node (100b) is aware of the DU of the child IAB node (100c) resource configuration and the location of CSS/C at the DU of the child IAB node (100c). At S602a-S603a, the DU of the parent IAB node (100b) receives information about of the resource configuration and configuration of cell-specific signals/channels of the DU of the child IAB node (100c) from one of: the MT of the child IAB node (100c) and the CU of the donor node (100d).

At S604a, configuring, by the parent IAB node (100b), the time domain allocation configuration to the MT of the child IAB node (100c). At S605a, identifying, by the parent IAB node (100b), resource configured as one of hard and for "one of transmission and reception of cell-specific signal/channel" based on the resource configuration of the DU of the child IAB node (100c). At S606a, determining, by the parent IAB node (100b), offset from the plurality of offsets corresponding to the resource configured as one of the hard and for "one of transmission and reception of cell-specific signal/channel". At S607a, updating, by the parent IAB node (100b), the time domain allocation configuration by removing entries corresponding to the offset from the time domain allocation configuration. At S608a, sending, by the parent IAB node (100b), the indication to the MT of the child IAB node (100c) to update the time domain allocation configuration. At S609a, scheduling, by the parent IAB node (100b), the MT of the child IAB node (100c) is based on the updated time-domain allocation configuration.

Referring to FIG. 6B: At S600b, sending, by the CU of the donor node (100d), the resource configuration and configuration of cell specific signals/channels to the DU of the child IAB node (100c). At S601b, the MT of the child IAB node (100c) is aware of the DU of the child IAB node (100c) resource configuration. At S602b-S603b, the DU of the parent IAB node (100b) receives information about the resource configuration and configuration of cell-specific signals/channels of the DU of the child IAB node (100c) from one of: the MT of the child IAB node (100c) and the CU of the donor node (100d).

At S604b, configuring, by the parent IAB node (100b), the time domain allocation configuration to the MT of the child IAB node (100c), wherein the time domain allocation configuration comprises the plurality of offsets. At S605b, identifying, by the parent IAB node (100b), resource configured as one of hard and for "one of transmission and reception of cell-specific signal/channel" based on the resource configuration of the DU of the child IAB node (100c). At S606b, determining, by the parent IAB node (100b), the offset from the plurality of offsets corresponding to the resource configured as one of hard and for "one of transmission and reception of cell-specific signal/channel".

At S607b, remapping, by the parent IAB node (100b), the offset in the time domain allocation configuration based on the resource configuration of the DU of the child IAB node (100c) by ignoring the resource configured as one of hard and for "one of transmission and reception of cell-specific signal/channel. At S608b, sending, by the parent IAB node (100b), an indication to the MT of the child IAB node (100c) to remap offset in the time domain allocation configuration. At S609b, scheduling, by the parent IAB node (100b), resource for MT of the child IAB node (100c) based on the remapped offset in the time domain allocation configuration.

Referring to FIG. 6C: At S600c, sending, by the CU of the donor node (100d), the resource configuration and configuration of cell specific signals/channels to the DU of the child IAB node (100c). At S601c-S602c, the DU of the parent IAB node (100b) receives information about one of the resource configuration and configuration of cell-specific signals/channels of the DU of the child IAB node (100c) from one of: the MT of the child IAB node (100c) and the CU of the donor node (100d).

At S603c, receiving, by the MT of the child IAB node (100c), a DCI that schedules of: transmission of the UL data and reception of the DL data. At S604c, preparing, by the MT of the child IAB node (100c), for the reception of the DL data or transmission of UL data. At S605c, the occurrence of the conflict situation between the MT of the child IAB node (100c) and the DU of the child IAB node (100c). At S606c, receiving, by the MT of the child IAB node (100c), the indication from the parent IAB node (100b). At S607c, detecting, by the MT of the child IAB node (100c), whether the indication is one of: discard one of reception of the DL data and transmission the UL data, and delay one of reception of the DL data and transmission of the UL data. The MT of the child IAB node (100c) is performed one of: discarding reception of the DL data or transmission of the UL data in response to detecting that the indication is discarded reception of DL data or transmission of UL data, and delaying reception of the DL data or transmission of the UL data in response to detecting that the indication is delay reception of the DL data or transmission of the UL data.

Figure 7:
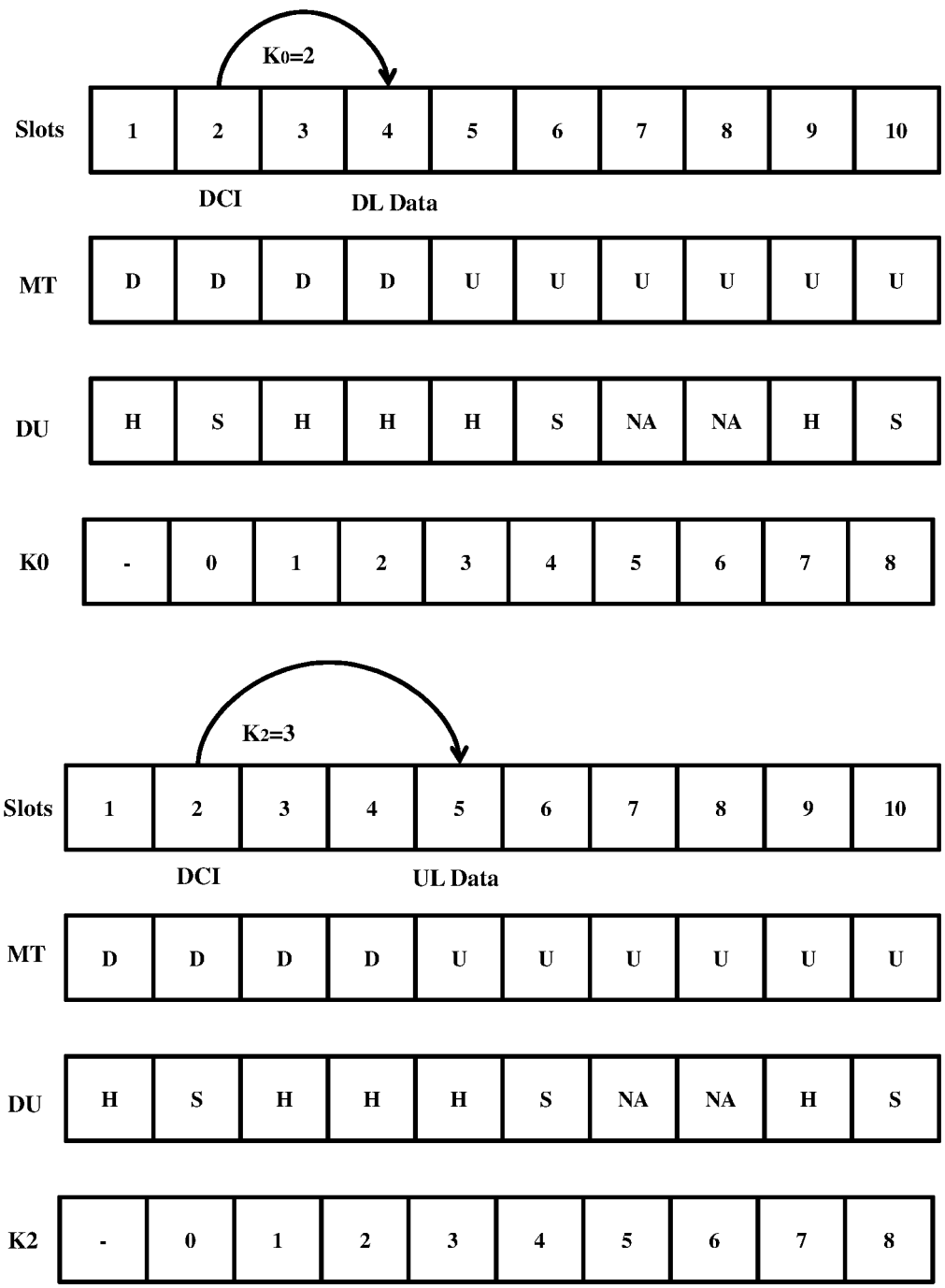
FIG. 7 illustrates a sample slot pattern for a Mobile Terminal (MT) of the IAB node and a Distributed Unit (DU) of the IAB node, where $K_0$ and $K_2$ interpretation is based on updated time-domain allocation configuration, according to an embodiment as disclosed herein.

FIG. 7 illustrates a sample slot pattern for the MT of the IAB node (100) and the DU of the IAB node (100), where $K_0$ and $K_2$ interpretation is based on updated time-domain allocation configuration, according to an embodiment as disclosed herein.

Time-domain resource allocation for uplink and downlink in the control information: In the case of the IAB nodes (100), the resources of DU are configured as H/S/NA in addition to the direction (DL/UL). A sample slot pattern for the MT of the IAB node (100) and the DU of the IAB node (100) is shown in FIG. 7. A hard DU slot implies that the DU of IAB node (100) can transmit/receive without any indication from the parent IAB node (100b). In a TDM based resource partitioning, this implies that the MT of the IAB node (100) cannot transmit/receive when the DU of the same IAB node (100) is hard. Therefore, such slots should not be configured either for downlink data transmission from the parent IAB node (100b) to the reference IAB node (100a) or for uplink data transmission from the reference IAB node (100a) to the parent IAB node (100b). This needs to be taken care in configuring the values for UL and DL time domain resource allocation.

To interpret $K_0/K_2$ values in the downlink control information: The downlink control information contains the offset between the downlink control channel and the corresponding downlink data channel as well as the offset between the downlink control channel and the consequent uplink data channel. Let $K_0$ represent the offset between the downlink control channel, in number of slots, and the corresponding downlink data channel, and $K_2$ represent the offset between the downlink control channel and the corresponding uplink data channel, in a number of slots. The $K_0$ and $K_2$ are integer values, indicated through the index of a row of the corresponding table that is configured by higher layers. This is called the "Time Domain Allocation Table".

Furthermore, an example "Time Domain Allocation Table" for various $K_0$ values is shown in Table 1. Each row of the table corresponds to a combination of $K_0$, S, and L, where the parameters S and L represent the start symbol and the length respectively. This table can be configured per the UE (200) and can also be modified semi-statically. The number of bits used for the Time Domain Allocation field in the control channel is calculated by the UE (200) based on the number of entries in the configured table. Since the configured table is different for different UEs, the number of bits may be different for different UEs.

For example, consider Table 1, which illustrates a sample "Time-domain allocation table". There are 16 rows in the table and therefore the time domain allocation field (to indicate $K_0$) is of 4 bits. If the number of rows in the table was 8, then the number of bits would have been 3 and so on. In general, the length of the time domain allocation field, to indicate $K_0$, is given by ceil ($\log_2$(Number of rows in Time domain allocation table)).

TABLE 1

Sample configuration table for $K_0$

| Row Index | $K_0$ | S | L |
|---|---|---|---|
| 1 | 0 | 3 | 5 |
| 2 | 0 | 3 | 9 |
| 3 | 1 | 3 | 8 |
| 4 | 1 | 3 | 6 |
| 5 | 1 | 3 | 4 |
| 6 | 2 | 8 | 2 |
| 7 | 2 | 6 | 4 |
| 8 | 3 | 5 | 6 |
| 9 | 3 | 5 | 2 |
| 10 | 3 | 9 | 2 |
| 11 | 3 | 10 | 2 |
| 12 | 4 | 1 | 11 |
| 13 | 5 | 1 | 6 |
| 14 | 6 | 2 | 4 |
| 15 | 6 | 4 | 6 |
| 16 | 7 | 8 | 4 |

Similarly, a "Time-domain allocation table" is also configured for the offset $K_2$ to the UE (200) semi-statically and is shown in Table 2. The length of the field that is used to represent $K_2$ also depends on the number of rows in the time domain allocation table for $K_2$.

TABLE 2

Sample configuration table for $K_2$

| Row Index | K2 | S | L |
|---|---|---|---|
| 1 | 0 | 3 | 5 |
| 2 | 0 | 3 | 9 |
| 3 | 1 | 3 | 8 |
| 4 | 1 | 3 | 6 |
| 5 | 2 | 3 | 9 |
| 6 | 2 | 8 | 4 |
| 7 | 3 | 7 | 4 |
| 8 | 4 | 5 | 6 |
| 9 | 4 | 5 | 2 |
| 10 | 5 | 9 | 2 |
| 11 | 6 | 10 | 2 |

In the IAB node (100), when the access and backhaul links are multiplexed using TDM and if the DU of IAB node (100) resource is configured as a hard resource, then the MT of IAB node (100) cannot use that resource. When the parent IAB node (100b) schedules the MT of the child IAB node (100c), it schedules according to the time domain allocation table (Table. 1) configured for the MT of the child IAB node (100c). If a specific $K_0/K_2$ value configured for MT points to a DU hard resource, the parent IAB node (100b) cannot schedule DL/UL data for the MT of the child IAB node (100c) in that slot. Various methods to handle this situation/problem are explained below.

To reduce the control channel payload: A Time-domain allocation table (separately for K0 and K2) is configured to the MT of the child IAB node (100c) by the DU of the parent IAB node (100b). The DU of the child IAB node (100c) receives a resource configuration from the CU (indicating the slots as H/S/NA). The information on the DU of the child IAB node (100c) resource configuration is also sent to the DU of the parent IAB node (100b), either by the MT of the child IAB node (100c) or by the CU of the donor node (100d) itself. Since the slots configured as hard for the DU of the child IAB node (100c) cannot be used by the MT of the child IAB node (100c) for Tx/Rx, the corresponding rows in the table become invalid. Those invalid rows need to be removed from the table.

For example, considering FIG. 7. The slots 3, 4, and 5 are configured as 'H' for the DU of the child IAB node (100c). The DCI is transmitted in slot 2. The value of $K_0$ corresponding to slots {3, 4 and 5} are {1, 2 and 3} respectively. Therefore, rows 3 to 11 in the sample table illustrated in Table. 1 becomes invalid. Since both the DU of the parent IAB node (100b) and MT of the child IAB node (100c) are aware of the 'H' slots at the DU of the child IAB node (100c), the DU of the parent IAB node (100b) will not schedule the MT of the child IAB node (100c) in those slots. Both the DU of the parent IAB node (100b) and the MT of the child IAB node (100c) remove the entries in the table that corresponds to the 'H' resource at the DU of the child IAB node (100c). Therefore, the number of rows in the time domain allocation table reduces. The length of the time domain allocation field, which is calculated after removing the invalid entries in the table, is also reduced. The same reduction also happens in the case of the time domain allocation field used to indicate the offset $K_2$. The total size of the downlink control information depends on the size of each field present in the DCI. This can reduce the size of the DCI payload size, which in turn increases the reliability of the DCI. The payload size of the DCI reduces when the size of the UL or DL data time-domain allocation field is reduced. A maximum of 4 bits is used for the time domain allocation field for DL data or the UL data in the DCI. So, a maximum of 4 bits can be saved if all the time allocation values correspond to hard resources. For example, in NR, the payload size for DCI format 1_0 that schedules the UE (200) in an active BWP of 20 RBs is calculated to be 36 bits. After the above saving, the resultant DCI size will be reduced to 36−4=32 bits which is equivalent to 11.1%.

Figure 8:
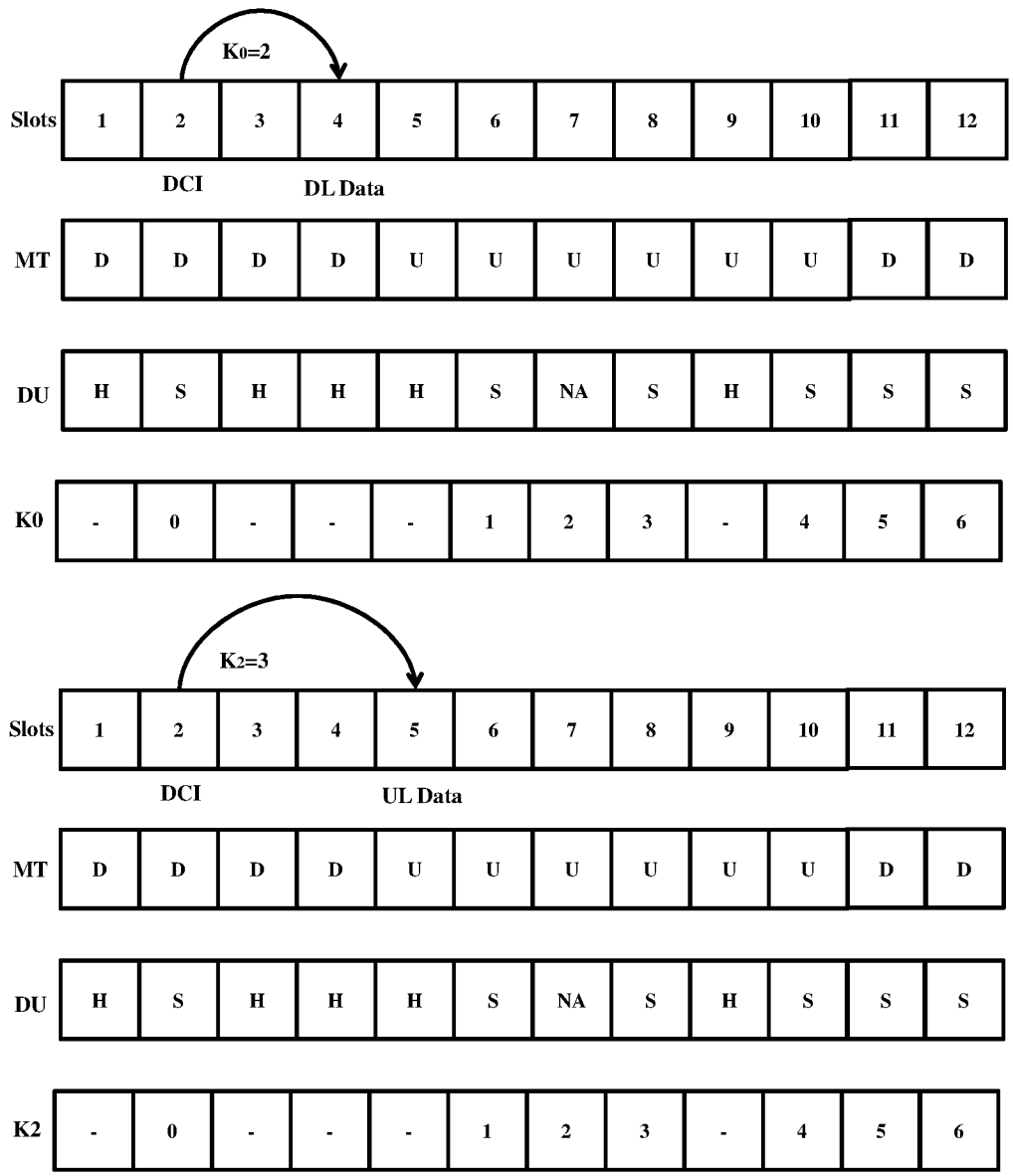
FIG. 8 illustrates a sample slot pattern for the MT of the IAB node MT and the DU of the IAB node, where $K_0$ and $K_2$ interpretation is based on a remapped offset in the time domain allocation configuration, according to an embodiment as disclosed herein.

FIG. 8 illustrates a sample slot pattern for the MT of the IAB node (100) and the DU of the IAB node (100), where $K_0$ and $K_2$ interpretation is based on remapped offset in the time domain allocation configuration, according to an embodiment as disclosed herein.

To improve efficient control channel scheduling A Time-domain allocation table (separately for $K_0$ and $K_2$) is configured to the MT of the child IAB node (100c) by the DU of the parent IAB node (100b). The DU of the child IAB node (100c) receives a resource configuration from the CU of the donor node (100d) (indicating the slots as H/S/NA).

The information on the DU of the child IAB node (100*c*) resource configuration is also sent to the DU of the parent IAB node (100*b*), either by the MT of the child IAB node (100*c*) or by the CU of the donor node (100*d*) itself. In this method, instead of removing the entries in the time domain allocation table corresponding to the 'H' resource at the DU of the child IAB node (100*c*), the way of interpreting the $K_0/K_2$ values is changed. Then entries of the time domain allocation table point to the S/NA resources at the DU of the child IAB node (100*c*) that are present after the transmission of DCI. This way of interpretation is shown in FIG. 8.

FIG. 8 illustrates a sample slot pattern for the MT of the IAB node (100) and the DU of the IAB node (100), where $K_0/K_2$ interpretation is based on the method. Here the DCI is received in slot 2. The value of $K_0=1$ points to the first 'S/NA' slot found after DCI (i.e., slot 6), $K_0=2$ points to the second 'S/NA' slot found after DCI (i.e., slot 7), and so on. The method does not reduce the size of the time domain allocation field as in the method to reduce the control channel payload. However, in the method to reduce the control channel payload, DCI present in slot 2 can schedule DL/UL data in slots up to slot 9, whereas in the method to improve efficient control channel scheduling 2 since the 'S' or NA slots are alone considered, slots up to slot 12/13 can be scheduled. This improves the scheduling flexibility compared to the method to reduce the control channel payload.

Figure 9:
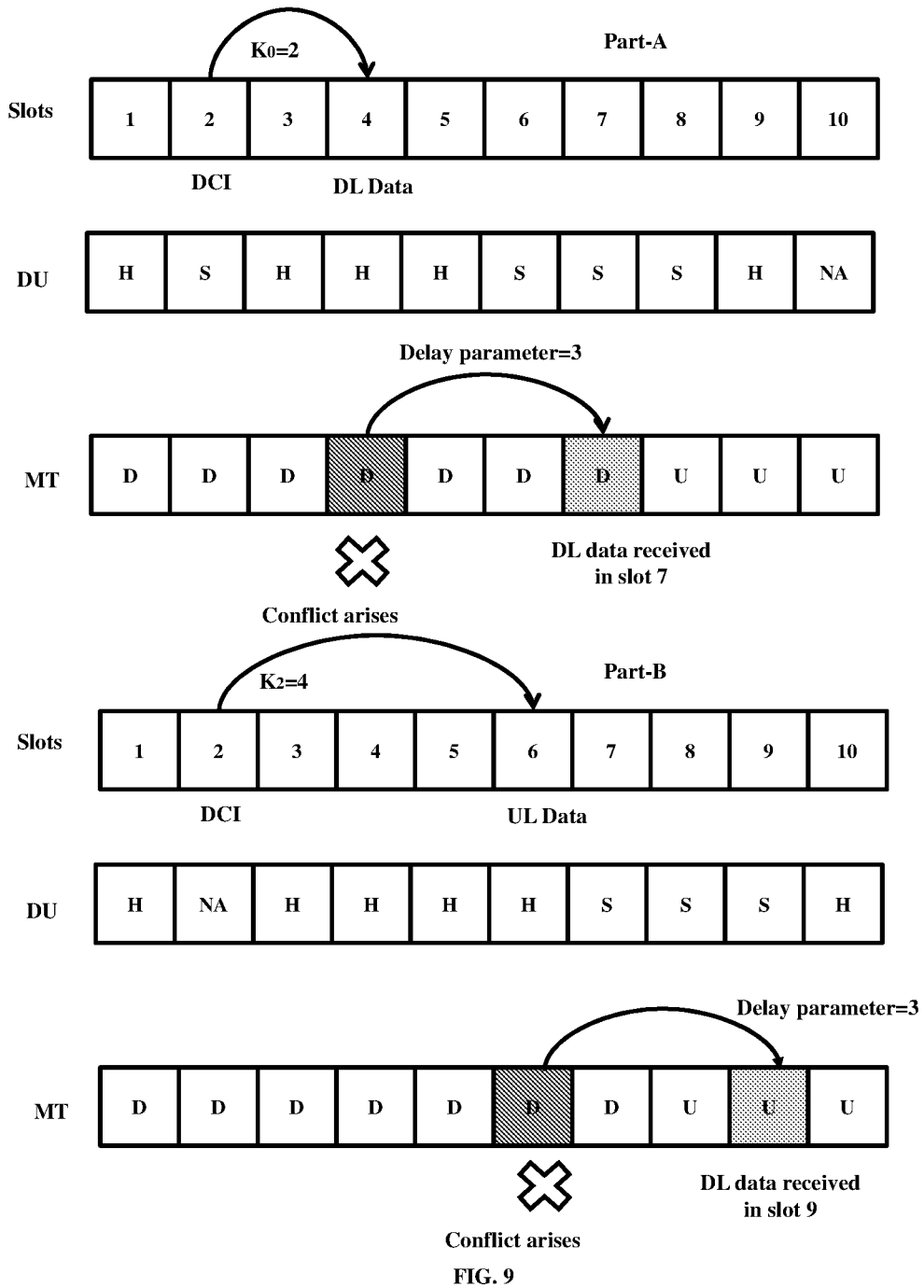
FIG. 9 illustrates a sample slot pattern for the MT of the IAB node MT and the DU of the IAB node, where conflict is occurred between the resource utilized at the MT of the child IAB node and the DU of the child IAB node, according to an embodiment as disclosed herein.

FIG. 9 illustrates a sample slot pattern for the MT of the IAB node (100) and the DU of the IAB node (100), where conflict is occurred between the resource utilized at the MT of the child IAB node (100*c*) and the DU of the child IAB node (100*c*), according to an embodiment as disclosed herein.

To avoid conflicts that might arise due to discrepancies between semi-static and dynamic resource allocation: This method is used when there is a conflict between the MT of the child IAB node (100*c*) and the DU of the child IAB node (100*c*).

Example of conflicts include:
1. The DU of the child IAB node (100*c*) is configured as soft/NA but has to transmit/receive cell-specific channels/signals (CSS/C) and the MT of the child IAB node (100*c*) is scheduled to transmit or receive, or
2. The DU of the child IAB node (100*c*) is configured as 'H' and the MT of the child IAB node (100*c*) is scheduled to transmit or receive. The CSS/C represents important signals such as synchronization signal blocks (SSBs), channel state information reference signals (CSI-RS), random access channel (RACH), etc.

A Time-domain allocation table is configured to the MT of the child IAB node (100*c*) by the DU of the parent IAB node (100*b*). The DU of the child IAB node (100*c*) receives a resource configuration from the CU of the donor node (100*d*) (indicating the slots as H/S/NA). When the MT of the child IAB node (100*c*) receives a DCI that schedules a downlink/uplink data in a hard DU resource or in the slots that result in a conflict, it prepares to receive or transmit the corresponding downlink/uplink data that is ready to be received/transmitted in that slot.

The parent IAB node (100*b*) should indicate via L1 signaling or RRC signaling to MT of the child IAB node (100*c*) whether to discard this downlink/uplink data or to receive/transmit it later.

If the parent IAB node (100*b*) informs the MT of the child IAB node (100*c*) to receive/transmit the downlink/uplink data later, then the processing time taken by MT to prepare the packet can be saved. The MT of the child IAB node (100*c*) should also be signaled, either by DCI or higher layer signaling, where to receive/transmit the delayed downlink/uplink data, i.e., the value of delay in several slots to receive/transmit the DL/UL data. If it is signaled in DCI, a new field should be introduced indicating the MT of the child IAB node (100*c*) were to receive/transmit if it is not received/transmitted in the slot indicated by the downlink control information. The procedure is illustrated using sample slot formats for DU of the child IAB node (100*c*) and MT of the child IAB node (100*c*) in FIG. 9.

In part A of FIG. 9, the DCI is transmitted in slot 2 and schedules the corresponding DL data in slot 4. However, there is a conflict situation in slot 4. Therefore, the MT prepares to receive the DL data packet at slot 7 (with a delay of 3 slots). This is because the delay parameter of 3 slots is configured by the DU of the parent IAB node (100*b*) apriori. Similarly, in part B of the FIG. 9, the DCI in slot 2 provides a grant for UL data in slot 6. The MT of the child IAB node (100*c*) prepares the UL data packet in slot 6. However, there is a conflict in slot 6 and the MT of the child IAB node (100*c*) transmits the prepared UL data in slot 9 (since the delay of 3 slots has been configured apriori by the DU of the parent IAB node (100*b*)).

Selection of the suitable method based on the following condition:
1. The occurrence of a conflict situation between the MT of the child IAB node (100*c*) and the DU of the child IAB node (100*c*).

Method to avoid conflicts that might arise due to discrepancies between semi-static and dynamic resource allocation is chosen when there is a conflict between the MT of the child IAB node (100*c*) and the DU of the child IAB node (100*c*).

The method to reduce the control channel payload and the method to enable more flexible signaling of resources, improve efficient control channel scheduling and is applicable when there is no conflict between the MT of the child IAB node (100*c*) and the DU of the child IAB node (100*c*).

There are different conditions possible based on the method to reduce the control channel payload and the method to enable more flexible signaling of resources, improve efficient control channel scheduling.

In condition-1: the MT of the child IAB node (100*c*) has the algorithm for any one of the method embedded in it and the DU of the parent IAB node (100*b*) is aware of the method available at the MT of the child IAB node (100*c*). In this case, the DU of the parent IAB node (100*b*) will schedule the MT of the child IAB node (100*c*) based on the available method.

In condition 2: the MT of the child IAB node (100*c*) has mechanisms for both the method embedded in it and the parent IAB node (100*b*) is aware of the availability of both the method at the MT of the child IAB node (100*c*). In this case, a suitable method is selected dynamically. The selection of the method is performed at the DU of the parent IAB node (100*b*). If the parent IAB node (100*b*) aims to reduce the payload for the DCI and thereby improve the quality of DCI, then the DU of the parent IAB node (100*b*) chooses the method to reduce the control channel payload. If the DU of the parent IAB node (100*b*) aims to improve the scheduling flexibility, i.e., if the DU of the parent IAB node (100*b*) needs to schedule either DL data or UL data at the slots which are at a higher offset from the slot containing DCI, then the DU of the parent IAB node (100*b*) chose the method to enable more flexible signaling of resources, improve efficient control channel scheduling. The selected method is indicated to the MT of the child IAB node (100c) using a single bit "Offset_Indication_Selection" flag either in DCI or in higher layer signaling.

To interpret $K_1$ value: The parameter $K_1$ represents the offset between the downlink data to the uplink control, in several slots. It is called the Downlink Data-to-HARQ-Feedback Timing indicator. $K_1$ is signaled by the DU of the parent IAB node (100b) through downlink control information to indicate the time resources to transmit uplink control. It is an integer value. ACK/NACK is transmitted depending on the success of the downlink data reception. Similar to $K_0/K_2$ values, $K_1$ is indicated through an index of a set of $K_1$ values. This set of values (dl-DataToUL-ACK) are given apriori by the DU of the parent IAB node (100b) to the MT of the child IAB node (100c) via higher layer signaling.

For example, let the set $\{1, 2, 3, 4, 5, 6, 7, 8\}$ represent the set of possible values for dl-DataToUL-ACK signaled using higher layer signaling. The index of the selected value from the set is indicated to the MT of the child IAB node (100c). For example, if the offset between the downlink data and uplink control is 3 slots, then index=3 is sent as $K_1$ value. As in the case of $K_0/K_2$, the size of the field that represents the offset $K_1$ depends on the number of elements in the set. If the set contains 2 elements, then the size of the offset field is 1 bit. If the set contains 4 elements, then the size of the offset field is 2 bits. If the set contains 8 elements, then the size of the offset field is 3 bits. A sample table is shown below, where the indication of the offset for the case of 1, 2, 3 bits are shown in table.3.

TABLE 3

Sample configuration for $K_1$

Downlink Data-to-HARQ_feedback timing indicator

| 1 bit | 2 bits | 3 bits | Number of slots k |
|---|---|---|---|
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

As mentioned in the case of $K_0/K_2$ offsets, the offset $K_1$ should not point to the slots where the DU of the child IAB node is configured as 'H'. Various methods to handle this issue are explained in FIG. 10 and FIG. 11.

Figure 10:
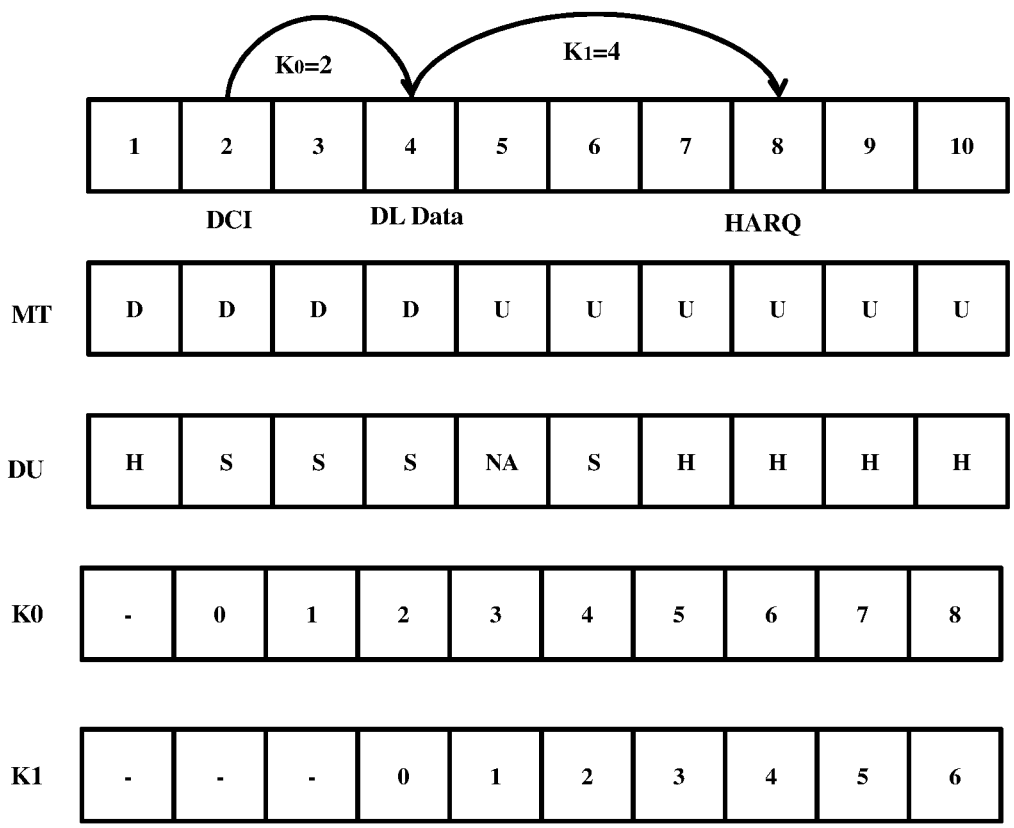
FIG. 10 illustrates a sample slot pattern for the MT of the IAB node MT and the DU of the IAB node, where $K_1$ interpretation is based on updated time-domain allocation configuration, according to an embodiment as disclosed herein.

FIG. 10 illustrates a sample slot pattern for the MT of the IAB node (100) and the DU of the IAB node (100), where $K_1$ interpretation is based on updated time-domain allocation configuration, according to an embodiment as disclosed herein.

To reduce the control channel payload: In this method, both the DU of the parent IAB node (100b) and the MT of the child IAB node (100c) are aware of the slots configured as 'H' at the DU of the child IAB node (100c). The DU of the parent IAB node (100b) will not use those values of $K_1$ that correspond to the 'H' slots of the DU of the child IAB node (100c). Both the DU of the parent IAB node (100b) and the MT of the child IAB node (100c) remove the entries from the set that corresponds to the 'H' resources at the DU of the child IAB node (100c). This leads to a reduction in the size of the $K_1$ field and thereby reduction in the size of the DCI. FIG. 10 illustrates sample formats for the MT of the child IAB node (100c) and the DU of the child IAB node (100c) where the DL data is transmitted in slot 4. The DU of the child IAB node (100c) is configured as 'H' in slots 7-10 (at offset 3-6). Therefore, $K_1$ of $\{3, 4, 5, 6\}$ are invalid and only $K_1$ of $\{1, 2\}$ should be used.

The payload size of the DCI can be reduced by reducing the Downlink Data-to-HARQ feedback timing indicator field. A maximum of 3 bits can be saved using HARQ feedback field in the DCI. The payload size for DCI format 1_0 that schedules the UE (200) in an active BWP of 20 RBs is calculated to be 36 bits. After the above saving, the resultant DCI size will be reduced to 36−3=33 bits which is equivalent to 8.3%.

Figure 11:
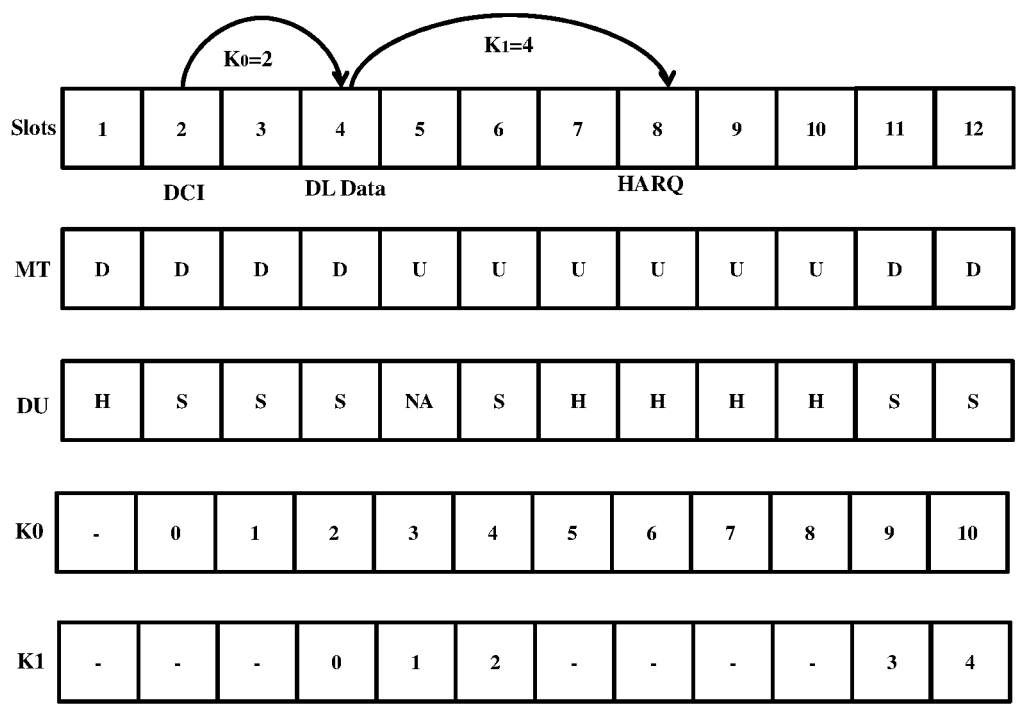
FIG. 11 illustrates a sample slot pattern for the MT of the IAB node MT and the DU of the IAB node, where $K_1$ interpretation is based on the remapped offset in the time domain allocation configuration, according to an embodiment as disclosed herein.

FIG. 11 illustrates a sample slot pattern for the MT of the IAB node (100) and the DU of the IAB node (100), where $K_1$ interpretation is based on remapped offset in the time domain allocation configuration, according to an embodiment as disclosed herein.

To enable more flexible signaling of resources, improve efficient control channel scheduling: In this method, both the DU of the parent IAB node (100b) and the MT of the child IAB node (100c) are aware of the slots configured as 'H' at the DU of the child IAB node (100c). In the method, the way of interpretation of the set dl-DataToUL-ACK is changed, i.e., the elements of the setpoint to the S/NA resources that follow the downlink data. FIG. 11 illustrates sample formats for the MT of the child IAB node (100c) and the DU of the child IAB node (100c) where the value of $K_1$ is interpreted as explained in this method.

The above method is applicable when both the DU of the parent IAB node (100b) and the MT of the child IAB node (100c) are aware of the resource configuration at the DU of the child IAB node (100c).

There are different conditions possible based on the method. In condition 1: the MT of the child IAB node (100c) has the algorithm for any one of the method embedded in it and the DU of the parent IAB node (100b) is aware of the method available at the MT of the child IAB node (100c). In this case, the DU of the parent IAB node (100b) will schedule the MT of the child IAB node (100c) based on the available method.

In condition 2: the MT of the child IAB node (100c) has a mechanism for both the method embedded in it and the parent IAB node (100b) is aware of the availability of both the method at the MT of the child IAB node (100c). In this case, a suitable method is selected dynamically. The selection of the method is performed at the parent DU. If the parent aims to reduce the payload for the DCI and thereby improve the quality of DCI, then the DU of the parent IAB node (100b) chooses the method to reduce the control channel payload. If the DU of the parent IAB node (100b) aims to improve the scheduling flexibility, i.e., if the DU of the parent IAB node (100b) needs to schedule either DL data or UL data at the slots which are at a higher offset from the slot containing DCI, then the DU of the parent IAB node (100b) chose the method to enable more flexible signaling of resources, improve efficient control channel scheduling. The selected method is indicated to the MT of the child IAB node (100c) using a single bit "Offset_Indication_Selection" flag either in DCI or in higher layer signaling.

Figure 12:
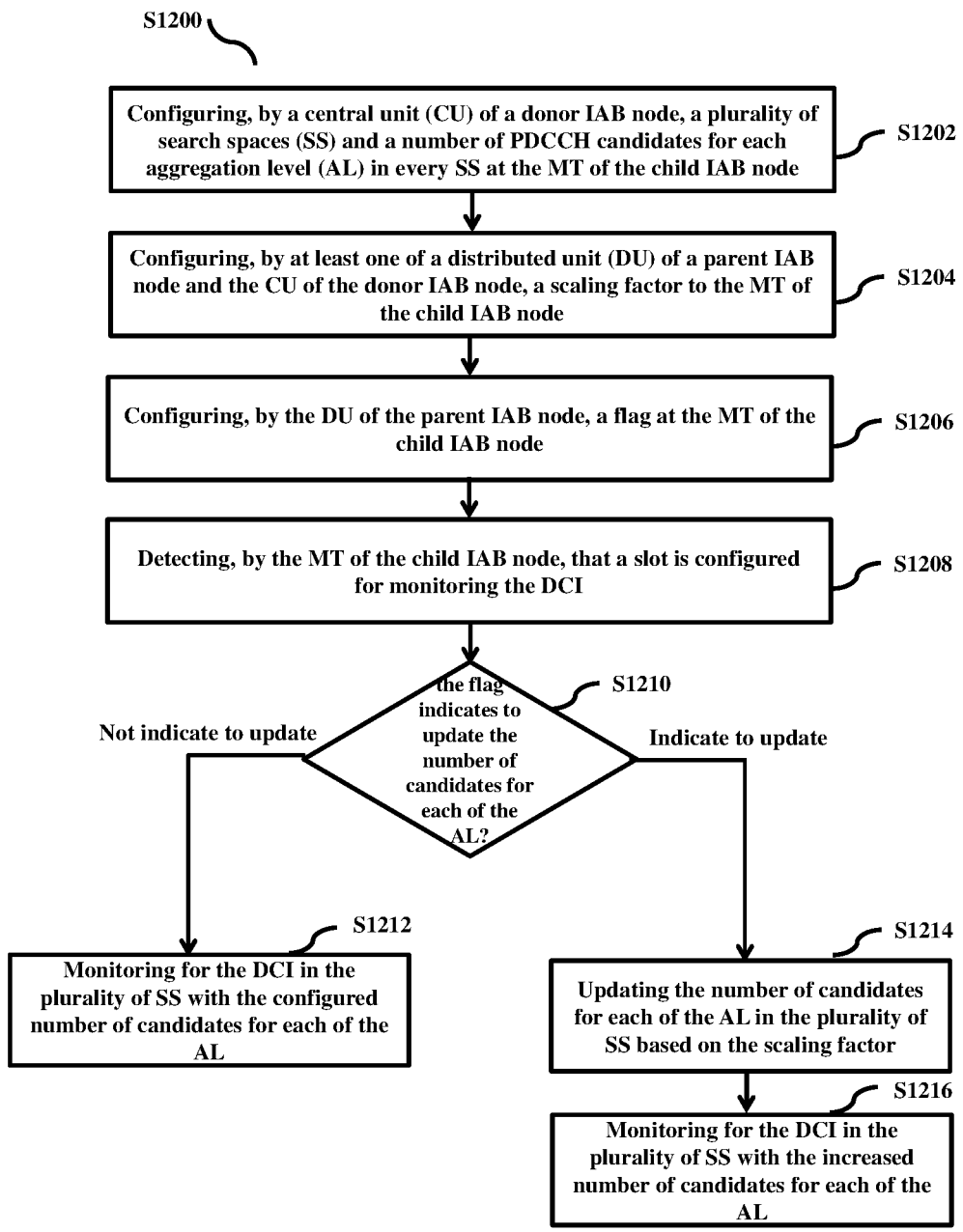
FIG. 12 is a flow diagram illustrating a method for provisioning signalling in the IAB network for performing a blind decoding of a Downlink Control Information (DCI) in the plurality of search spaces (SS) based on a scaling factor and a flag, according to an embodiment as disclosed herein.

FIG. 12 is a flow diagram (S1200) illustrating a method for provisioning signalling in the IAB network for performing the blind decoding of the DCI in the plurality of SS based on the scaling factor and the flag, according to an embodiment as disclosed herein.

At S1202, the method includes configuring, by the CU of the donor node (100d), the plurality of SS, and the number of PDCCH candidates for each AL in every SS at the MT of the child IAB node (100c). At S1204, the method includes configuring, by the of the DU of the parent IAB node (100b) and the CU of the donor node (100d), the scaling factor to the MT of the child IAB node (100c). At S1206, the method includes configuring, by the DU of the parent IAB node (100b), the flag at the MT of the child IAB node (100c). At S1208, the method includes detecting, by the MT of the child IAB node (100c), that the slot is configured for monitoring the DCI.

At S1210, the method includes determining, by the MT of the child IAB node (100c), whether the flag indicates to update the number of candidates for each of the AL. At S1212, the method includes monitoring for the DCI in the plurality of SS with the configured number of PDCCH candidates for each of the AL in response to determining that the flag does not indicate to update the number of candidates for each of the AL. At S1214, the method includes updating the number of PDCCH candidates for each of the AL in the plurality of SS based on the scaling factor in response to determining that the flag indicates to update the number of PDCCH candidates for each of the AL. At S1216, the method includes monitoring for the DCI in the plurality of SS with the increased number of candidates for each of the AL.

The various actions, acts, blocks, steps, or the like in the flow diagram (S1200) may be performed in the order presented, in a different order or simultaneously. Further, in some embodiments, some of the actions, acts, blocks, steps, or the like may be omitted, added, modified, skipped, or the like without departing from the scope of the invention.

Increasing the number of candidates to schedule the DCI: The MT of the IAB node (100) behaves like the UE (200) to the parent IAB node (100b). The DL transmission from the DU of the parent IAB node (100b) to the MT of the child IAB node (100c) carries downlink control information and downlink data as for any other UE. The MT of the IAB node (100), however, is a more sophisticated unit. Since it is stationary (in a planned deployment) and is powered by mains supply, there are no stringent power restrictions as in the case of normal UE. This can be utilized to improve downlink control monitoring, as compared to a normal UE.

The downlink control information is transmitted in a specific time-frequency region. The UE (200) has knowledge of the time-frequency resources used for the control channel Here onwards, the term "control region" will be used to denote the time-frequency region used for the control channel. The control region is divided into control channel elements (CCEs). Each CCE can contain multiple resource blocks (RBs) and is the basic unit used to carry the control channel information. Each DCI can occupy 1, 2, 4, 8, or 16 CCEs. The number of CCEs used to signal the DCI is called the Aggregation Level (AL). For example, AL of 4 means that 4 CCEs are used to transmit the DCI. The AL for a DCI is based on the size of the DCI and the channel conditions. If the size of the DCI is high, then more resources are needed to transmit the DCI, so this leads to more CCEs. Similarly, when the channel conditions are poor, then lower rate codes are used to improve the quality of DCI reception at the child MT. Therefore, this again requires more resources and more CCEs to transmit the DCI.

The DCI can be of different formats, based on the content. For example, DCI with control information specific to the UE/MT of the child IAB node (100c) is called the UE (200) specific DCI and DCI with control information common for groups of UEs/MT of the child IAB nodes (100c) is called the cell-specific DCI. Correspondingly, the control region also has the UE (200) specific search space (USS) to accommodate the UE (200) specific DCIs and cell-specific search space to accommodate cell-specific search space (CSS). There can be multiple search spaces (SS) defined for a UE/child MT. The UE/MT of the child IAB nodes (100c) does not know the exact slot where DCI is present. Also, the location of the DCI inside the control region (whether DCI is in CSS or USS) and the AL used for DCI are not know. Therefore, a blind search needs to be performed over different SS for different ALs. Sometimes, the number of searches may grow beyond bound.

In order to limit the power consumption on the blind decodings, it is required to reduce the number of blind decodings that can be performed in a slot. There is periodicity and offset defined for monitoring every SS. Therefore, only a subset of the available SS need to be monitored in each slot. Also, a maximum number of searches to be performed for each AL, for each SS, is signaled by the BS/parent DU. Due to this maximum number of searches specified for every AL, possible candidate locations for DCI are restricted and the blind decodings need to be performed only over those candidate locations. However, in some slots, multiple SS may need to be monitored. Therefore, the total number of blind decodings might still become very high. Therefore, a limit is defined on the total blind decodings that can be performed in a slot.

The limitation on blind decodings imposes a restriction on the scheduling flexibility of the DCI since the BS/DU of the parent IAB node (100b) has to transmit the DCI only on the CCEs that are configured for blind decoding for that UE/MT of the child IAB node (100c). And if the number of blind decodings in a slot exceeds the limit per slot, the excess blind decodings will be skipped. This effect will be significant when DCI of more cell edge UEs are scheduled in the same slot. This is called downlink control information blocking which means that the DCI of a UE/MT of the child IAB node (100c) cannot be scheduled in a slot even though sufficient resources are available because these available resources will not be there in the configured search spaces for the UE/MT of the child IAB node (100c).

The DCI blocking could be serious in the IAB network (1000). In the case of the IAB node (100), time resources are shared between MT and DU. Therefore, lesser slots would be available for scheduling a child MT. This implies that if the MT of the child IAB node (100c) cannot be scheduled due to downlink control information blocking then the DU of the parent IAB node (100b) has to wait for a longer time to schedule that MT of the child IAB node (100c), which increases the latency of the system. This problem can be avoided by increasing the number of available candidates to schedule DCI for the MT of the child IAB node (100c).

The IAB nodes (100) are stationary and are powered using mains supply. Therefore, the MT of the child IAB node (100c) is not constrained by power limitations like the UE. Therefore, the number of candidates for DCI can be increased in the case of MT of IAB nodes (100). If the number of DCI candidates for each aggregation level could be increased and the limit on the number of blind decodings an MT can perform per slot is increased, the flexibility for scheduling a downlink control information for the MT can be increased. This is illustrated in FIG. 13 and FIG. 14.

Figure 13:
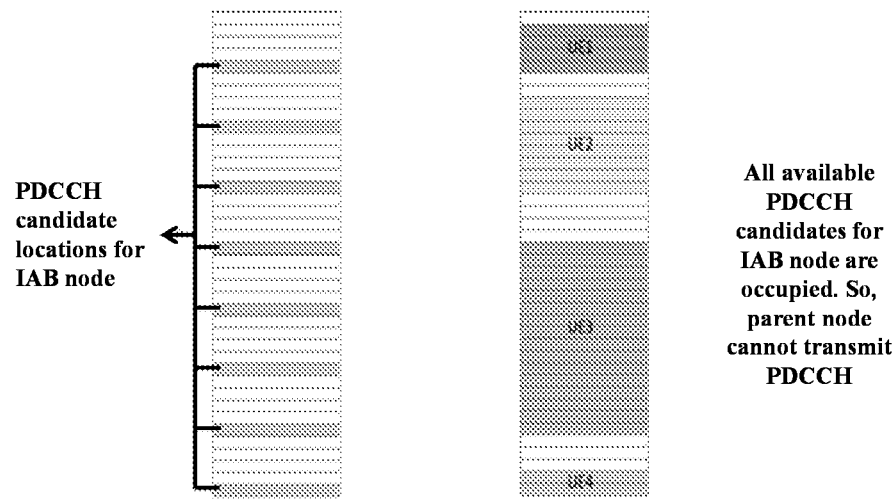
FIG. 13 illustrates a sample scheduling method using several DCI candidates as per 5G (NR), according to an embodiment as disclosed herein.

FIG. 13 illustrates a sample scheduling method using several DCI candidates as per 5G (NR), according to an embodiment as disclosed herein.

A pictorial representation of scheduling 4 access UEs and the MT of the child IAB node (100c) by the DU of the parent IAB node (100b) is shown in FIG. 13. According to the FIG. 13, the DCI of UE1, UE2, UE3, and UE4 is transmitted with aggregation levels of 4, 8, 16, and 2 respectively. And the picture on left shows the available DCI candidates for the MT of the child IAB node (100c). As shown in the FIG. 13 on right, all the available DCI candidates of the MT of the child IAB node (100c) are occupied by the DCI of access UEs. Hence, the DU of the parent IAB node (100b) will not be able to schedule the MT of the child IAB node (100c) in that slot.

Figure 14:
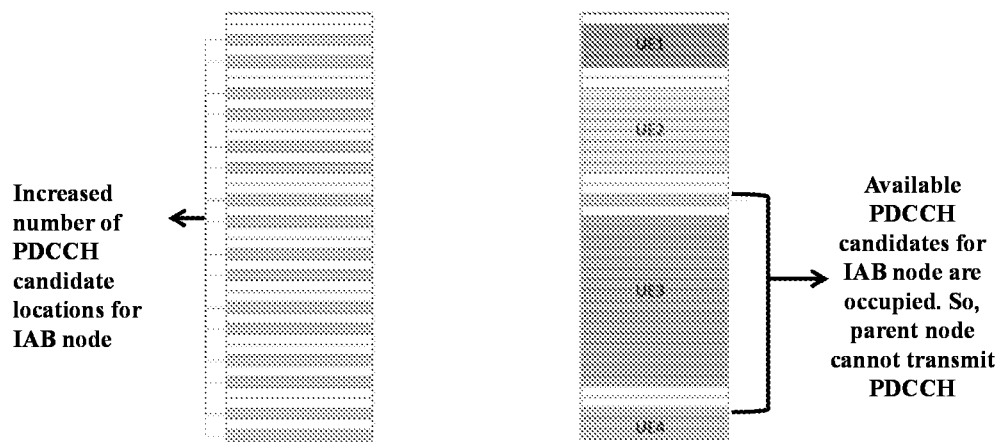
FIG. 14 illustrates a sample scheduling method with an increased number of DCI candidates, according to an embodiment as disclosed herein.

FIG. 14 illustrates a sample scheduling method with an increased number of DCI candidates, according to an embodiment as disclosed herein.

The problem describes in the FIG. 13 can be solved by increasing the number of DCI candidate locations for the MT of the child IAB node (100c) while it stays the same for access UEs. In FIG. 14, the left part of the picture shows the possible DCI candidates for scheduling the MT of the child IAB node (100c) after increasing the number of blind decodings. As shown in the right part of FIG. 14, even after scheduling UE1, UE2, UE3, and UE4, there are available DCI candidates for scheduling the DCI of the MT of the child IAB node (100c).

Increase the number of possible DCI candidates for the MT of the child IAB node (100c): a new higher layer parameter is introduced to increase the number of blind decodings that can be done by the MT of the child IAB node (100c). The new parameter is an aggregation level multiplication factor. It has a value greater than 1. The factor can be sent either through L1 signaling or using higher layer signaling. Upon receiving the multiplication factor, the MT of the child IAB node (100c) increases the number of candidates for each aggregation level as per equation 1:

$$\text{New Number of candidates per Aggregation Level} = \text{existing Number of candidates per Aggregation Level} * \text{AL multiplication factor.} \quad (1)$$

Therefore, the number of blind decodings that the MT of the child IAB node (100c) should perform increases. The advantage of the method is the DU of the parent IAB node (100b) can control the number of blind decodings the MT of the child IAB node (100c) has to perform by controlling the aggregation level multiplication factor.

Figure 15:
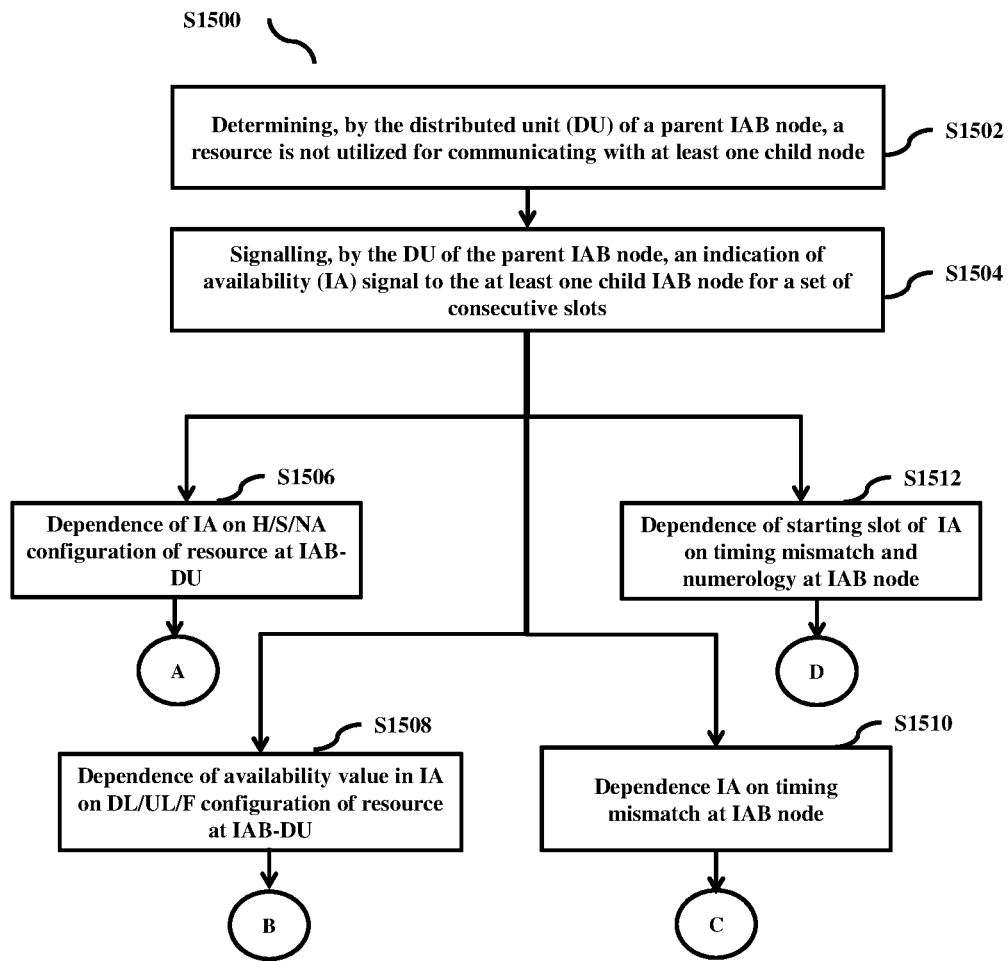
FIG. 15 is a flow diagram illustrating a method for provisioning signalling in the IAB network for signalling an indication of availability (IA) signal to the child IAB node, according to an embodiment as disclosed herein.
Figure 15:
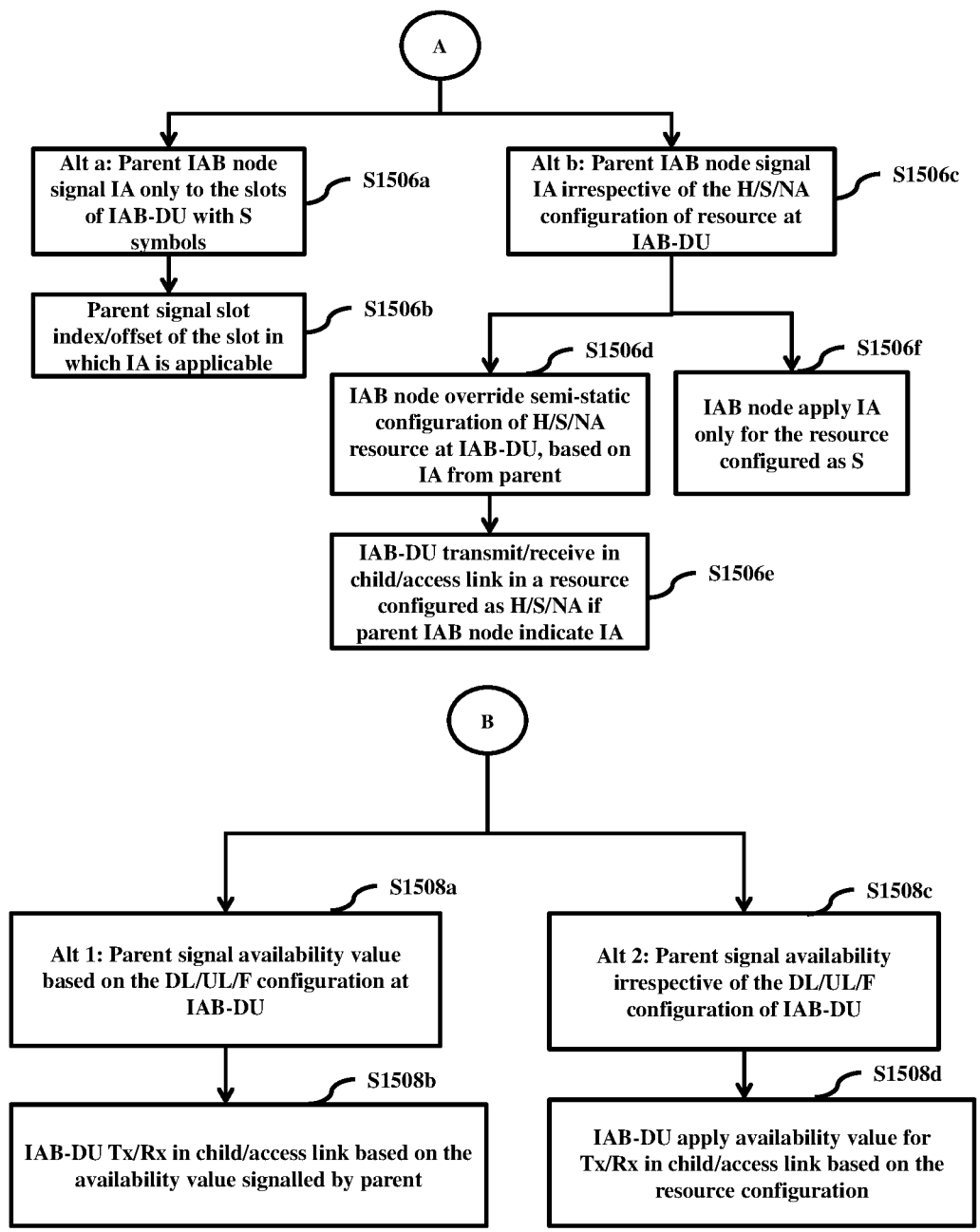
Figure 15:
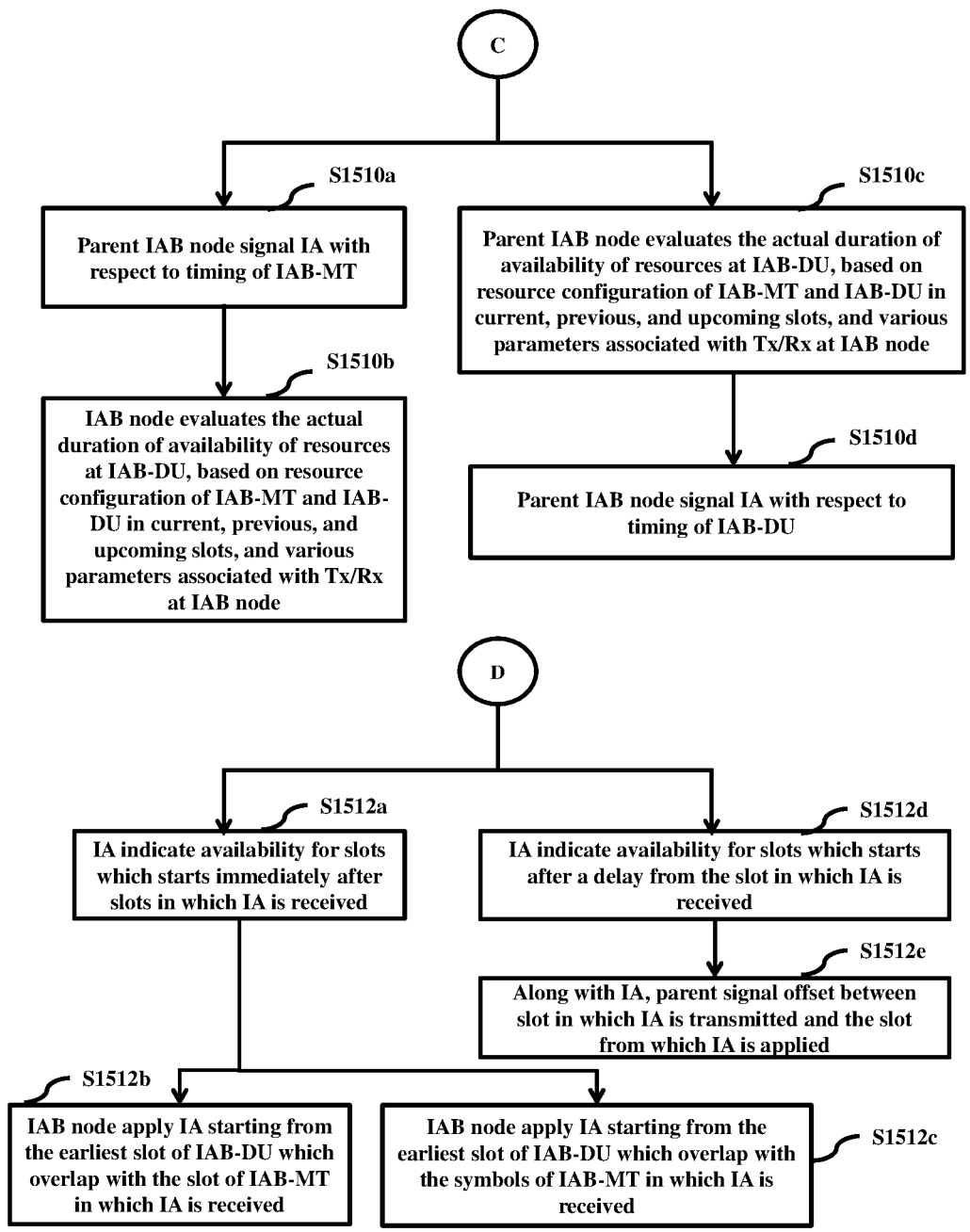

FIG. 15 is a flow diagram (S1500) illustrating a method for provisioning signalling in the IAB network (1000) for signalling the IA signal to the child IAB node (100c), according to an embodiment as disclosed herein.

At S1502, the method includes determining, by the DU of the parent IAB node (100b), the resource is not utilized for communicating with the child IAB node (100c). At S1504, the method includes signalling, by the DU of the parent IAB node (100b), the IA signal to the child IAB node (100c) for the set of consecutive slots. At S1506, the method includes dependence of the IA signal on H/S/NA configuration of resource at the DU of the IAB node (100). At S1508, the method includes dependence of availability value in the IA signal on DL/UL/F configuration of resource at the DU of the IAB node (100). At S1510, the method includes dependence the IA signal on timing mismatch at the IAB node (100). At S1512, the method includes dependence of starting slot of the IA signal on timing mismatch and numerology at the IAB node (100).

At S1506, two alternatives, at S1506a, the method includes parent IAB node (100b) signal the IA signal only to the slots of the DU of the IAB node (100) with S symbols. At S1506b, the method includes the parent IAB node (100b) signal slot index/offset of the slot in which the IA signal is applicable. At S1506c, the method includes parent IAB node (100b) signal the IA signal irrespective of the H/S/NA configuration of resource at the DU of the IAB node (100). At S1506d, the method includes the IAB node (100) override semi-static configuration of H/S/NA resource at the DU of the IAB node (100) based on the IA signal from the parent IAB node (100b). At S1506e, the method includes the DU of the IAB node (100) transmit (Tx)/receive (Rx) in child/access link in the resource configured as H/S/NA if parent IAB node (100b) indicates the IA. At S1506f, the method includes the IAB node (100) apply the IA only for the resource configured as the S.

At S1508, two alternatives, at S1508a, the method includes the parent IAB node (100b) signal availability value based on the DL/UL/F configuration at the DU of the IAB node (100). At S1508b, the method includes the DU of the IAB node (100) Tx/Rx in the child/access link based on the availability value signalled by the parent IAB node (100b). At S1508c, the method includes the parent IAB node (100b) signal availability irrespective of the DL/UL/F configuration of the DU of the IAB node (100). At S1508d, the method includes the DU of the IAB node (100) apply availability value for the Tx/Rx in the child/access link based on the resource configuration.

At S1510, two alternatives, at S1510a, the method includes the parent IAB node (100b) signal the IA signal with respect to timing of the MT of the IAB node (100). At S1510b, the method includes the IAB node (100) evaluates the actual duration of availability of resources at the DU of the IAB node (100), based on resource configuration of the MT of the IAB node (100) and the DU of the IAB node (100) in current, previous, and upcoming slots, and various parameters associated with Tx/Rx at the IAB node (100). At S1510c, the method includes the parent IAB node (100b) evaluates the actual duration of availability of resources at the DU of the IAB node (100), based on resource configuration of the MT of the IAB node (100) and the DU of the IAB node (100) in current, previous, and upcoming slots, and various parameters associated with Tx/Rx at the IAB node (100). At S1510d, the method includes the parent IAB node (100b) signal the IA signal with respect to timing of the DU of the IAB node (100).

At S1512, two alternatives, at S1512a, the method includes the IA indicate availability for slots which starts immediately after slots in which the IA is received. At S1512b, the method includes the IAB node (100) apply the IA starting from the earliest slot of the DU of the IAB node (100) which overlap with the slot of the MT of the IAB node (100) in which the IA is received. At S1512c, the method includes the IAB node (100) apply the IA starting from the earliest slot of the DU of the IAB node (100) which overlap with the symbols of the MT of the IAB node (100) in which the IA is received. At S1512d, the method includes the IA indicate availability for slots which starts after a delay from the slot in which the IA is received. At S1512e, the method includes along with the IA, the parent IAB node (100b) signal offset between slot in which the IA is transmitted and the slot from which the IA is applied. Further details are explained in the FIG. 16 to FIG. 18.

The various actions, acts, blocks, steps, or the like in the flow diagram (S1500) may be performed in the order presented, in a different order or simultaneously. Further, in some embodiments, some of the actions, acts, blocks, steps, or the like may be omitted, added, modified, skipped, or the like without departing from the scope of the invention.

Figure 16:
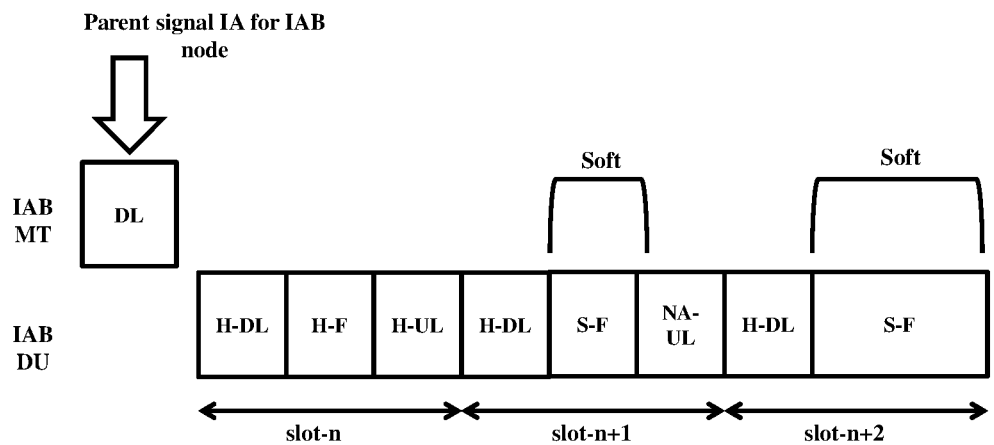
FIG. 16 illustrates an indication of availability for a soft resource at the DU of the child IAB node, according to an embodiment as disclosed herein.

FIG. 16 illustrates an indication of availability for the soft resource at the DU of the child IAB node (100c), according to an embodiment as disclosed herein.

Dynamic signaling of IA: the availability of the resource configured as soft for the DU of the IAB node (100) is under the control of the parent IAB node (100b). When the parent IAB node (100b) is not using the resource for communicating with the MT of the child IAB node (100c), the parent IAB node (100b) will signal IA to the child IAB node (100c), and the DU of the child IAB node (100c) will use the soft resource for communicating in the child/access link. This method of signaling IA is known as explicit IA. The parent IAB node (100b) signal IA to the child IAB node (100c) which indicate the availability of resources for several slots, where these slots are either continuous or discontinuous. The number of slots for which the parent IAB node (100b) signal IA is at least equal to the IAB monitoring periodicity of IA. The DU of an IAB node (100) can have the resource of type downlink (DL), uplink (UL), and Flexible (F). Therefore, the availability can take 8 different values as given in Table 4. Based on the table, if the availability value is 1 for a slot, then only DL resources of the slot are available for DU of IAB node for Tx/Rx in child/access link.

TABLE 4

Values indicating resource availability and their meaning

| Value | Meaning |
|---|---|
| 0 | No resource available |
| 1 | DL resource available |
| 2 | UL resource available |
| 3 | DL and UL resource available |
| 4 | F resource available |
| 5 | DL and F resource available |
| 6 | UL and F resource available |
| 7 | All resources available |

The parent IAB node (100b) signals IA for a group of child IAB nodes (100c) and is signalled in the form of availability combinations, where each availability combination indicates availability for a set of slots of each child IAB node (100c). Here, each availability combination can take different values from Table. 4, and each value corresponds to a slot. E.g., consider an availability combination as {4, 5, 1}, then the combination is applicable for a set of 3 slots, and based on the signalled availability value only F resources are available (corresponds to value 4 in Table. 4) in the first slot, DL and F resources are available (corresponds to value 5 in Table. 4) in the second slot, and only DL resources are available in the third slot.

Consider the scenario illustrated in FIG. 16, where three slots, slots n, slot n+1, and slot n+2, of the DU of the IAB node (100) are shown. The IA from the parent IAB node (100b) is received on the MT of an IAB node (100) in one of the DL symbols of slot n−1. Here, all symbols of slot n are configured as H and therefore, the DU of the IAB node (100) does not require IA from the parent IAB node (100b) to use the resource. Therefore, signaling IA for all the slots irrespective of resource type leads to unnecessary signaling. However, indicating IA only for the S slots requires per-link signalling, and additional signalling of the slot index. Therefore, the parent IAB node (100b) indicates IA for slots of the child IAB node (100c) based on the following techniques, 1. The parent IAB node (100b) signal IA for a set of consecutive slots of IAB-DU irrespective of its H/S/NA configuration, and the IAB node (100) apply IA only for the S symbols. E.g., if the parent IAB node (100b) signals availability value as 6 for slot n+1 in FIG. 10, then based on Table 4, IA indicates both F and UL resources are available for child-DU. But the UL resource is semi-statically configured as NA for slot n+1, therefore the child IAB node (100c) treats only F symbol as available.
2. The parent IAB node (100b) signal IA for a set of consecutive slots of IAB-DU irrespective of its H/S/NA configuration, based on which the child IAB node (100c) overrides the semi-static configuration. E.g., if the parent IAB node (100b) signals availability value as 6 for slot n+1 in FIG. 10, then based on Table 4, IA indicates both F and UL resources are available for the DU of the child IAB node (100c). But the UL resource is semi-statically configured as NA for slot n+1, but the child IAB node (100c) treats the NA-UL resource as available based on availability value signalled by the parent IAB node (100b).
3. The parent IAB node (100b) signals IA only for those slots of IAB-DU with S symbols.

The IA signal is a bitmap indicating the availability of each resource type in a slot for each child IAB node (100c). The resource type is one of DL, UL, and F resources. Therefore, the availability value is applicable for a slot of IAB-DU based on the DL/UL/F configuration of resource IAB-DU. E.g., in FIG. 16, only F resource type is configured as soft in slot n+1. Therefore, only availability value 4 from Table 4 applies to slot n+1. The parent IAB node (100b) can signal availability value based on the DL/UL/F configuration of S resource at IAB-DU or irrespective of the DL/UL/F configuration. Therefore, the parent IAB node (100b) indicate availability value for slots of the child IAB node (100c) based on one of the following techniques, 1. The parent IAB node (100b) signals availability value for a slot based on the semi-static configuration of DL, UL, and F resources at the DU of the child IAB node (100c). E.g., in FIG. 9, the parent IAB node (100b) indicates availability value for slot n+1 as 4 alone.
2. The parent IAB node (100b) signals availability value for a slot irrespective of the semi-static resource configuration of DL, UL, and F resources at the DU of the child IAB node (100c), but the child IAB node (100c) apply IA based on the semi-static configuration. E.g., if the parent IAB node (100b) signals availability value as 6 for slot n+2 in FIG. 16, then based on Table 4, both F and UL resources are available for the DU of the child IAB node (100c). But, slot n+2 did not have any UL resource. Therefore, the child IAB node (100c) ignores IA signaling for UL resource and treat IA only for the F resource.

Figure 17:
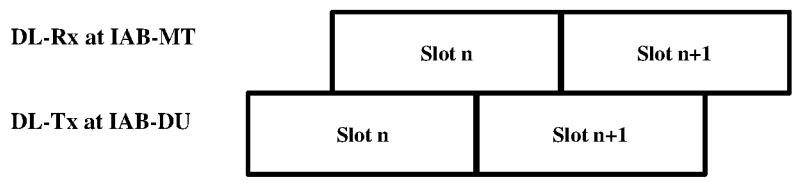
FIG. 17 illustrates a timing mismatch at the MT of the IAB node MT and the DU of the IAB node based on resource configuration, according to an embodiment as disclosed herein.

FIG. 17 illustrates a timing mismatch at the MT of the IAB node (100) and the DU of the IAB node (100) based on resource configuration, according to an embodiment as disclosed herein.

In the IAB network (1000) DL-Tx from all IAB nodes (100) should be aligned to achieve synchronization. The timing of various Tx/Rx at MT and DU of an IAB node (100) will vary based on the propagation delay in the backhaul link, the timing advance (TA) applied by the IAB node (100) in the backhaul link, and the TA applied by the child/access UE (200) of the IAB node (100). E.g., If DL-Tx at the DU of the IAB node (100) is considered as reference, then the DL-Rx at the MT of the IAB node (100) will be delayed by the propagation delay between the DU of the parent IAB node (100b) and the MT of the IAB node (100). Similarly, the MT of the IAB node (100) will advance its UL-Tx symbols from DL-Rx symbols by the factor TA, signalled from the parent-DU. Therefore, the timing of symbols of the MT of the IAB node (100) and the DU of the IAB node (100) varies based on the resource configuration. Consequently, the parent IAB node (100*b*) can signal IA for the S resource with respect to the timing of either the MT of the IAB node (100) or the DU of the IAB node (100) symbols. The actual duration of symbol availability depends on the resource configuration of the MT of the IAB node (100) and the DU of the IAB node (100) in current, previous, and upcoming slots.

E.g., FIG. 17 illustrates the timing difference between DL-Rx slot at the MT of the IAB node (100) and DL-Tx slot at the DU of the IAB node (100). In FIG. 17, if the parent IAB node (100*b*) signal IA for IAB node in slot n+1, then the DU of the IAB node (100) can use an initial portion of slot n+1 for Tx in child/access link only when slot n is configured as H for the DU of the IAB node (100) or last few symbols of slot n of the MT of the IAB node (100), which are overlapping with slot n+1 of the DU of the IAB node (100), are not configured by the parent IAB node. In case, the parent IAB node (100*b*) signals IA for soft resource with respect to the timing of the MT configuration, then the IAB node (100) derives the duration over which the resource is available for DU for Tx/Rx in child/access link depending on the configuration of the MT of the IAB node (100) and the DU of the IAB node (100) in current, previous, and upcoming slots. In case IA is signalled with respect to DU timing, then the parent IAB node (100*b*) evaluates the symbols available for IAB-DU to Tx/Rx in child/access link based on resource configuration of the MT of the IAB node (100) and the DU of the IAB node (100) in current, previous and upcoming slots and signal IA accordingly.

Figure 18:
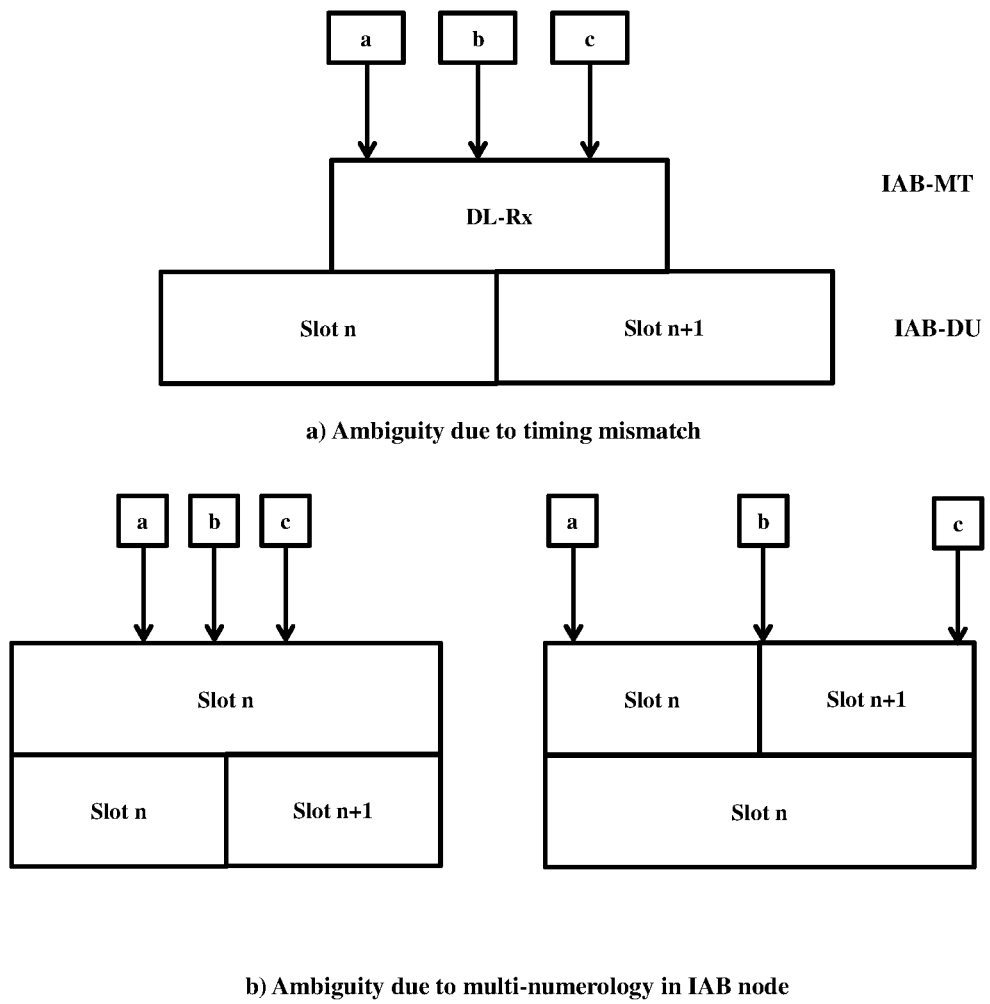
FIG. 18 illustrates an ambiguity over a starting slot in which IA is applied at the IAB-DU, when the MT of the IAB node MT and the DU of the IAB node follow different numerology, according to an embodiment as disclosed herein.

FIG. 18 illustrates an ambiguity over a starting slot in which IA is applied at the IAB-DU, when the MT of the IAB node (100) and the DU of the IAB node (100) follow different numerology, according to an embodiment as disclosed herein.

An IA signaled by the parent IAB node (100*b*) applies for slots of the DU of the IAB node (100) which starts immediately after the slot of the MT of the IAB node (100) in which IA is received, or after a certain offset period from the slot of the MT of the IAB node (100) in which IA is received. In the former scenario, the timing misalignment between the MT of the IAB node (100) and the DU of the IAB node (100) creates ambiguity over the starting slot of indication of availability.

E.g., the notation "a" in FIG. 18, slot n of the MT of the IAB node (100) overlap with slot n+1 of the DU of the IAB node (100) due to propagation delay in the backhaul link of the IAB node (100). Figure also illustrates various possibilities at the MT of the IAB node (100) for receiving IA from the parent IAB node (100*b*). Let the MT of the IAB node (100) receive IA from the parent IAB node (100*b*) at point b or point c mentioned in the FIG. 18. If the received IA applies immediately to slots of IAB-DU, then IA can be applied to start from either slot n or slot n+1, because, in figure slot n of IAB-MT overlap with slot n and slot n+1 of the DU of the IAB node (100). A similar situation occurs when the MT of the IAB node (100) and the DU of the IAB node (100) follows different numerology. If the DU of the IAB node (100) has higher numerology than the MT of the IAB node (100), then the DU of the IAB node (100) has multiple slots within the slot duration of the MT of the IAB node (100). Therefore, the slot in which IA is received at the MT of the IAB node (100) can overlap with multiple slots of the DU of the IAB node (100), creating ambiguity over the starting point of applying IA.

E.g. the notation "b" in the FIG. 18 illustrate the slot structure of the MT of the IAB node (100) and the DU of the IAB node (100) in a multi-numerology scenario. FIG. 18 also illustrates various positions in the slot of the MT of the IAB node (100) where IA can be received. If IA is received at slot n of the MT of the IAB node (100) at positions b and c as mentioned in the FIG. 18, then IA overlaps with slot n+1 of the DU of the IAB node (100), thereby creating ambiguity whether IA is applicable from slot n of the DU of the IAB node (100) or slot n+1 of the DU of the IAB node (100). To overcome the ambiguity, IAB node (100) apply one of the following options to evaluate the starting position of applying the IA, 1. The DU of the IAB node (100) apply IA starting from the earliest slot of the DU of the IAB node (100) which overlap with one of the slot of the MT of the IAB node (100) in which IA is received
2. The DU of the IAB node (100) applies IA starting from the earliest slot of the DU of the IAB node (100) which overlap with one of the symbols of the MT of the IAB node (100) in which IA is received.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for provisioning signaling in an Integrated Access and Backhaul (IAB) network, comprising:
    configuring, by a central unit (CU) of a donor node, a plurality of search spaces (SS) and a number of physical downlink control channel (PDCCH) candidates for each aggregation level (AL) in every SS of the plurality of SS at a mobile terminal (MT) of the child IAB node;
    configuring, by at least one of a distributed unit (DU) of a parent IAB node and the CU of the donor node, a scaling factor to the MT of the child IAB node;
    scaling, by the MT of the child IAB node, the number of PDCCH candidates for each of the AL in the every SS of the plurality of SS based on the scaling factor; and
    performing, by the MT of the child IAB node, the blind decoding of at least one Downlink Control Information (DCI) using the number of scaled PDCCH candidates for each of the AL in every SS of the plurality of SS.

2. The method as claimed in claim 1, wherein the method comprises:
    configuring, by the DU of the parent IAB node, a flag at the MT of the child IAB node, wherein the flag indicates whether to use the scaling factor while performing the blind decoding of the at least one DCI at the MT of the child IAB node;
    detecting, by the MT of the child IAB node, that a slot is configured for monitoring the at least one DCI; and performing, by the MT of the child IAB node, the blind decoding of the at least one DCI in the plurality of SS based on the scaling factor and the flag.

3. The method as claimed in claim 2, wherein performing, by the MT of the child IAB node, the blind decoding of the DCI based on the scaling factor and the flag comprises:
determining, by the MT of the child IAB node, whether the flag indicates to update the number of candidates for each of the AL; and
performing, by the MT of the child IAB node, one of:
monitoring for the DCI in the plurality of SS with the configured number of PDCCH candidates for each of the AL in response to determining that the flag does not indicate to update the number of candidates for each of the AL, and
updating the number of PDCCH candidates for each of the AL in the plurality of SS based on the scaling factor in response to determining that the flag indicates to update the number of PDCCH candidates for each of the AL, and monitoring for the DCI in the plurality of SS with the increased number of candidates for each of the AL.

4. A system for provisioning signaling in an IAB network, wherein the system comprises:
a donor node comprising a central unit (CU) that configures a plurality of search spaces (SS) and a number of physical downlink control channel (PDCCH) candidates for each aggregation level (AL) in every SS of the plurality of SS at a mobile terminal (MT) of the child IAB node;
a parent Integrated Access Backhaul (IAB) node comprises a distributed unit (DU), wherein one of the DU of the parent IAB node and the CU of the donor node configures a scaling factor to the MT of the child IAB node; and
a child Integrated Access Backhaul (IAB) node comprising the MT that scales the number of PDCCH candidates for each of the AL in the every SS of the plurality of SS based on the scaling factor, and performs the blind decoding of at least one Downlink Control Information (DCI) using the number of scaled PDCCH candidates for each of the AL in every SS of the plurality of SS.

5. The system as claimed in claim 4, wherein the DU of the parent IAB node configures a flag at the MT of the child IAB node, wherein the flag indicates whether to use the scaling factor while performing the blind decoding of the at least one DCI at the MT of the child IAB node.

6. The system as claimed in claim 5, wherein the MT of the child IAB node detects that a slot is configured for monitoring the at least one DCI, and performs the blind decoding of the at least one DCI in the plurality of SS based on the scaling factor and the flag.

7. The system as claimed in claim 6, wherein perform the blind decoding of the DCI based on the scaling factor and the flag comprises:
determine whether the flag indicates to update the number of candidates for each of the AL; and
perform, one of:
monitor for the DCI in the plurality of SS with the configured number of PDCCH candidates for each of the AL in response to determining that the flag does not indicate to update the number of candidates for each of the AL, and
update the number of PDCCH candidates for each of the AL in the plurality of SS based on the scaling factor in response to determining that the flag indicates to update the number of PDCCH candidates for each of the AL, and monitoring for the DCI in the plurality of SS with the increased number of candidates for each of the AL.

* * * * *